(12) United States Patent
Suzuki et al.

(10) Patent No.: US 6,288,465 B1
(45) Date of Patent: Sep. 11, 2001

(54) COMBINED EXTERNALLY PRESSURIZED GAS-MAGNETIC BEARING ASSEMBLY AND SPINDLE DEVICE UTILIZING THE SAME

(75) Inventors: Nobuyuki Suzuki, Iwata; Hiroyuki Yamada, Fukuroi, both of (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/066,820

(22) Filed: Apr. 28, 1998

(30) Foreign Application Priority Data

Apr. 28, 1997 (JP) .................................................. 9-110824
Apr. 9, 1998 (JP) ................................................. 10-097505

(51) Int. Cl.$^7$ ............................ H02K 7/09; H01H 47/00; H05B 6/32
(52) U.S. Cl. ..................... 310/90.5; 361/143; 219/648
(58) Field of Search ..................... 310/90.5, 166, 310/90; 361/139, 143; 219/648

(56) References Cited

U.S. PATENT DOCUMENTS

| | | | | |
|---|---|---|---|---|
| 3,582,162 | * | 6/1971 | Baermann | 310/90.5 |
| 4,076,340 | * | 2/1978 | Meinke et al. | 310/90.5 |
| 4,245,869 | * | 1/1981 | Scheffer et al. | 310/90.5 |
| 4,389,849 | * | 6/1983 | Gasser et al. | 62/6 |
| 4,405,286 | * | 9/1983 | Studer | 417/1 |
| 4,584,750 | * | 4/1986 | Ozu et al. | 269/287 |
| 4,697,128 | * | 9/1987 | Matsushita et al. | 318/607 |
| 4,733,547 | * | 3/1988 | Honda | 68/12.05 |
| 4,806,835 | * | 2/1989 | Habermann | 318/607 |
| 4,827,168 | * | 5/1989 | Nakajima | 310/90 |
| 4,886,778 | * | 12/1989 | Moon et al. | 505/166 |
| 4,976,177 | * | 12/1990 | Fouche | 82/147 |
| 4,982,126 | * | 1/1991 | Jolivet et al. | 310/90 |
| 5,098,203 | | 3/1992 | Henderson | 384/12 |
| 5,179,304 | * | 1/1993 | Kenjo et al. | 310/12 |
| 5,345,127 | * | 9/1994 | New | 310/90.5 |
| 5,347,190 | * | 9/1994 | Lewis et al. | 310/90.5 |
| 5,355,040 | * | 10/1994 | New | 310/90.5 |
| 5,355,042 | * | 10/1994 | Lewis et al. | 310/90.5 |
| 5,570,572 | | 11/1996 | Birkenmaier et al. | 57/406 |
| 5,666,219 | * | 9/1997 | Ishizuka et al. | 359/200 |
| 5,818,137 | * | 10/1998 | Nichols et al. | 310/90.5 |
| 5,973,468 | * | 10/1999 | Yamauchi | 318/610 |

FOREIGN PATENT DOCUMENTS

| | | |
|---|---|---|
| 0580201A1 | 1/1994 | (EP) . |
| 0580202A1 | 1/1994 | (EP) . |
| 0765957A2 | 4/1997 | (EP) . |

\* cited by examiner

Primary Examiner—Elvin Enad
Assistant Examiner—Dang Dinh Le
(74) Attorney, Agent, or Firm—Birch, Stewart, Kolasch & Birch, LLP

(57) ABSTRACT

A combined externally pressurized gas and magnetic bearing assembly (3) includes an externally pressurized gas bearing (9) and a magnetic bearing (8) that are integrated together so as to have component parts common to both of the externally pressurized gas bearing (9) and the magnetic bearing (8). The externally pressurized gas bearing (9) or the magnetic bearing (8) may be disposed within an axial extent of the magnetic bearing (8) or the externally pressurized gas bearing (9), respectively. A spindle device (1) utilizing the combined externally pressurized gas and magnetic bearing assembly (3) is also provided which includes a housing (2) for supporting a main shaft (4) rotatably through the combined externally pressurized gas and magnetic bearing assembly (3). This combined externally pressurized gas and magnetic bearing assembly (3) can be applied not only to the radial bearing, but also to the axial bearing.

8 Claims, 18 Drawing Sheets

COMBINED EXTERNALLY PRESSURIZED GAS-MAGNETIC BEARING ASSEMBLY AND SPINDLE DEVICE UTILIZING THE SAME

BACKGROUND OF THE INVENTION

1. Field of the Invention

The present invention relates to a combined externally pressurized gas and magnetic bearing assembly in which an externally pressurized gas bearing and a magnetic bearing are combined together, and also to a spindle device employing the combined externally pressurized gas and magnetic bearing assembly. More particularly, the present invention relates to the combined externally pressurized gas and magnetic bearing assembly and the spindle device both suited for use in, for example, a high speed milling machine.

2. Description of the Prior Art

The magnetic bearing is known to have a feature in that because it has a relatively large bearing gap a loss of torque during rotation thereof is extremely small and it can exhibit a high static rigidity by an integral control.

FIG. 28 illustrates a longitudinal sectional view showing a prior art spindle device utilizing a magnetic bearing, which is used in a high-speed aluminum milling machine. This prior art spindle device includes a touch-down bearing 251, a tool 252, a displacement sensor 253, a radial magnetic bearing 254, an axial magnetic bearing 255, a drive motor 256, a radial magnetic bearing 257, a displacement sensor 258, and a main shaft 259. The spindle device utilizing the magnetic bearings has a performance of a maximum rotation of 40,000 rpm, and a maximum output of 15 kW, a maximum machining capacity of 1,250 $cm^3$/min, thus exhibiting an excellent performance for an aluminum milling work.

However, the spindle device utilizing the magnetic bearing is susceptible to influence brought about by a natural frequency of bending of the main shaft during the milling operation and, for this reason, requires the use of an extremely complicated control system. Accordingly, the known spindle device of the type discussed above is not suited as a spindle device for a versatile machine tool that is required to accommodate various processing conditions.

On the other hand, a non-contact bearing currently available other than the magnetic bearing includes an externally pressurized gas bearing. Although the externally pressurized gas bearing is known to have a high rotational accuracy and an excellent dynamic stability, the externally pressurized gas bearing has been little used in the versatile machine tool because of the compressivity and, hence, a low static rigidity and a low load bearing capacity.

In view of the foregoing, attempts have recently been made to use, as a spindle device for high speed machining purpose, a spindle device utilizing a composite bearing in which the externally pressurized gas bearing and the magnetic bearing are combined, such as shown in FIG. 29 in a longitudinal sectional representation. Referring to FIG. 29, reference numeral 263 represents a displacement sensor; reference numeral 264 represents a radial magnetic bearing; reference numeral 265 represents an axial magnetic bearing; reference numeral 266 represents an drive motor; reference numeral 267 represents a radial magnetic bearing; reference numeral 268 represents a displacement sensor; reference numeral 270 represents a displacement sensor; reference numeral 271 represents a main shaft; and reference numerals 272 and 273 represent respective externally pressurized gas bearings.

However, the spindle device utilizing the composite bearing shown in FIG. 29 has a problem in that since the magnetic bearings 264 and 267 and the externally pressurized gas bearings 272 and 273 are disposed one after another in an axial direction of the main shaft 271, not only is a relatively long main shaft 271 required, but the natural frequency of bending tends to be lowered. Also, since the spindle device shown in FIG. 29 makes use of a control system of a structure similar to that required in the spindle device utilizing solely the magnetic bearings, an additional problem has arisen that the dynamic stability of the externally pressurized gas bearing is impaired and it tends to function as a source of external disturbances.

Accordingly, the art has not yet been developed to the extent as to fulfill the objective of utilizing advantages of the externally pressurized gas bearing and also those of the magnetic bearing while counterbalancing demerits of those respective bearings.

SUMMARY OF THE INVENTION

Accordingly, the present invention has been devised with a view substantially eliminating the above discussed problems and is intended to provide a novel combined externally pressurized gas and magnetic bearing assembly which has an excellent dynamic rigidity, such as exhibited by the externally pressurized gas bearing, and also an excellent static rigidity, such as exhibited by the magnetic bearing, and which contributes to reduction in length of the main shaft, and an improved spindle device utilizing the novel combined externally pressurized gas and magnetic bearing assembly.

In order to accomplish the foregoing and other objects of the present invention, there is provided a novel combined externally pressurized gas and magnetic bearing assembly comprising an externally pressurized gas bearing and a magnetic bearing combined together in a predetermined relationship. Because of this, the bearing assembly can be obtained which can exhibit both the dynamic rigidity possessed by the externally pressurized gas bearing and the static rigidity possessed by the magnetic bearing.

While numerous combined externally pressurized gas and magnetic bearing assemblies of different constructions within the spirit of the present invention are disclosed, the combined externally pressurized gas and magnetic bearing assembly according to a first aspect of the invention is so designed as to combine the externally pressurized gas bearing and the magnetic bearing together by providing a magnetic bearing including an electromagnet having a core and a fluid restrictor defined in the core for supply of a gaseous medium under pressure into a bearing gap of the externally pressurized gas bearing.

The combined externally pressurized gas and magnetic bearing assembly according to a second aspect of the invention is of a design in which the magnetic bearing and the externally pressurized gas bearing are combined together with the magnetic bearing so as to have commonly shared component parts. It is to be noted that the combined externally pressurized gas and magnetic bearing assembly according to any one of the first to third aspects of the invention may be used as either a radial bearing or an axial bearing.

The combined externally pressurized gas and magnetic bearing assembly according to a third aspect of the invention is of a design in which a fluid restrictor is formed by a self-forming orifice or a normal orifice in a bearing stator of the magnetic bearing. The self-forming orifice performs a function as an orifice at a virtual cylindrical surface defined by and between a gas conduit and a bearing gap. The magnetic bearing includes a displacement measuring means for measuring a displacement of a rotor and is operable to support the rotor at a predetermined position by generating an electromagnetic force according to the displacement measured by the displacement measuring means. The displacement measuring means may be of a type capable of directly measuring the displacement of the rotor or of a type capable of indirectly measuring the displacement of the rotor, that is, of a type capable of measuring a different object to be measured that can eventually be converted into the displacement of the rotor.

The combined externally pressurized gas and magnetic bearing assembly according to a fourth aspect of the invention is a radial bearing and is of a design in which the externally pressurized gas bearing is accommodated within a width of the magnetic bearing in an axial direction.

The combined externally pressurized gas and magnetic bearing assembly according to a fifth aspect of the invention is a radial bearing and is of a design in which the magnetic bearing is accommodated within a width of the externally pressurized gas bearing in an axial direction.

The combined externally pressurized gas and magnetic bearing assembly according to a sixth aspect of the invention is a radial bearing and is of a design in which a bearing gap of the externally pressurized gas bearing a gap between the rotor and a core of the magnetic bearing are defined at the same position in an axial direction.

Where the magnetic bearing and the externally pressurized gas bearing are integrated together such as set forth in any one of the first to sixth aspects of the invention, the bearing assembly as a whole can be assembled compact as compared with the bearing assembly in which an externally pressurized gas bearing and a magnetic bearing are merely laid one after another in the axial direction.

Where the combined externally pressurized gas and magnetic bearing assembly is used as a radial bearing, the main shaft which serves as the rotor does not require an extra length solely for the purpose of accommodating the support by an externally pressurized gas and the support by a magnetic force separately and, therefore, the bearing assembly can have a reduced length in the axial direction with the main shaft of a reduced length. Accordingly, the natural frequency of bending can be increased to accomplish a high speed rotation. Also, the center point of support by the magnetic bearing and the center point of support of the externally pressurized gas bearing can be substantially matched with each other in the axial direction and, therefore, a control of both of those bearings can be achieved easily.

Where the combined externally pressurized gas and magnetic bearing assembly is used as an axial bearing, the bearing assembly as a whole can be assembled compact as compared with the bearing assembly in which an externally pressurized gas bearing and a magnetic bearing are merely laid one after another in the radial direction and, therefore, the diameter of each of opposite surfaces of the rotor confronting the bearings can be reduced.

Also, where the self-forming orifice is used for a fluid supply system of the externally pressurized gas bearing, the stability against the pneumatic hammer can be increased together with increase in bearing stability at the high frequency region, that is, in dynamic rigidity.

In any event, the self-forming orifice of the externally pressurized gas bearing is preferably defined in an electromagnetic force generating surface of the core of the electromagnet in the magnetic bearing and a gap between the electromagnetic force generating surface and the rotor is preferably of a size equal to or smaller than 0.1 mm.

The use of the fine self-forming orifice in the core of the electromagnet is effective to maximize the utilization of the cross-section of the core of the electromagnet which has hitherto been utilized only to provide a magnetic circuit for magnetic fluxes of the magnetic bearing. A space between neighboring yokes of the core can be utilized as a space for accommodating coils of the electromagnet and, therefore, although where the orifice is to be formed in that space, interference with the coils of the electromagnet must be taken into consideration, the formation of the orifice in the core eliminates such a problem associated with the interference with the coils.

In the event that the bearing assembly of the foregoing construction is used as a radial bearing, three or more electromagnets forming the magnetic bearing may be arranged in a circumferential direction with a pair of magnetic poles of each of the electromagnets oriented towards a rotary shaft in such a way that polarities of the magnetic poles of each electromagnet arranged on the same circumference may be matched with each other. The core of each electromagnet may be provided in a shape generally similar to, for example, a horseshoe, in a longitudinal cross-section.

By constructing the core of each electromagnet in the manner described above, the loss of hysteresis and the loss of eddy current which would be brought about at the rotor of the magnetic bearing incident to rotation of the rotor can be reduced advantageously. Because of those losses being lessened, emission of heat from the rotor can be suppressed and, therefore, reduction in size of the bearing gap which would be brought about by a thermal expansion of the rotor can be minimized to allow the externally pressurized gas bearing to exhibit a stabilized performance.

In the structure in which the magnetic poles are arranged in a direction parallel to a rotary shaft, ones of the magnetic poles of the cores of all of the electromagnets are mutually linked with each other.

By so constructing the core, not only can the number of steps of a process of making the electromagnet be reduced, but also the core loss at the rotor of the magnetic bearing which would occur incident to rotation of the rotor can further be reduced to permit the bearing assembly to accommodate a high speed rotation.

Where the combined externally pressurized gas and magnetic bearing assembly of the structure as set forth in any one of the first to third aspects of the invention is used as an axial bearing, the electromagnet and the fluid restrictor of the externally pressurized gas bearing may be arranged only on one side of the rotor with respect to the axial direction so that the rotor can be supported by an electromagnetic force of the magnetic bearing and a bearing force of the externally pressurized gas bearing that is counterbalanced with the electromagnetic force. The use of the electromagnet and the fluid restrictor only on one side of the rotor renders the bearing assembly to be assembled further compact in size.

The present invention also provides a spindle device utilizing the combined externally pressurized gas and magnetic bearing assembly. The bearing assembly used in the spindle device may be of the structure according to any one of the foregoing aspects of the invention for rotatably supporting a main shaft having the rotor formed therein.

According to this spindle device, not only can a relatively high static rigidity and a relatively high dynamic stability be obtained, but the main shaft can have a reduced length with increase in natural frequency of bending of the main shaft and, therefore, the spindle device can be used as a versatile high-speed machining spindle device.

In this spindle device of the structure described above, the combined externally pressurized gas and magnetic bearing assembly may be mounted on a load-side end portion of the main shaft. This is effective to a bearing force to effectively act against a radial load transmitted to that end portion of the main shaft. In particular, with respect to the static load, a high rigidity can be obtained by allowing the control of the magnetic bearing to be performed on the basis of an integral action or a proportional integral action.

The displacement measuring means for measuring the displacement of the rotor, which is employed in the combined externally pressurized gas and magnetic bearing assembly of the structure may be employed in the form of a pressure sensor for measuring a pressure developed at a bearing surface of the externally pressurized gas bearing so that the magnetic force developed by the magnetic bearing can be controlled by determining the displacement of the rotor by the utilization of a value measured by the pressure sensor.

By directly measuring the pressure at the bearing surface of the externally pressurized gas bearing and converting the measured value into the displacement of the rotor which is subsequently used to control the bearing, any possible erroneous operation of the sensor which would occur as a result of variation in magnetic characteristic at a rotor sensor target surface as is often observed with a sensor of any other system can be eliminated to accomplish a highly accurate sensing. By way of example, not only can detection of the displacement be achieved with high accuracy, for example, with a resolving power of the sub-micron order, but the sensor can be made compact enough to accommodate in the bearing assembly thereby rendering the bearing assembly compact in size. Also, by converting the pressure of the externally pressurized gas bearing into the displacement of the rotor, the center of bearing of the externally pressurized gas bearing can be set at the center of bearing of the magnetic bearing and, therefore, any possible interference therebetween can easily be avoided.

Where the pressure sensor is employed in the form of a semiconductor pressure sensor, a pressure measuring unit can be fabricated compact in size.

On the other hand, where the combined externally pressurized gas and magnetic bearing assembly of the structure is used as a radial bearing, the pressure sensor may be used to measure a difference of a static pressure at externally pressurized gas bearing surfaces opposed to each other in a direction diametrically of the rotor so that the displacement of the rotor can be determined by utilizing the values measured by the pressure sensor.

By so arranging the pressure sensor, the displacement of the rotor can be determined with high accuracy with a minimized number of pressure sensors used.

Where this combined externally pressurized gas and magnetic bearing assembly is used as an axial bearing, the pressure sensor may be used to measure respective pressures at three or more locations of the externally pressurized gas bearing surface, which are positioned on the same circumference of the externally pressurized gas bearing surface, so that the measured pressure values can be utilized to determine the displacement of the rotor in an axial direction. By setting the locations at which the pressure is to be measured, the displacement of the rotor in the axial direction can be measured accurately with a minimized number of the pressure sensors and, and hence, at a reduced cost.

Instead of the three locations at which the pressure is measured, respective pressures at two locations, which are positioned diametrically opposite to each other, may be measured by the pressure sensor so that the measured pressure values can be utilized to determine the displacement of the rotor in the axial direction. By so doing, the displacement of the rotor can be determined with high accuracy with a minimized number of pressure sensors used.

Where the combined externally pressurized gas and magnetic bearing assembly of the structure described above is used as an axial bearing, the electromagnets of the magnetic bearing and the fluid restrictor of the externally pressurized gas bearing may be positioned on respective axially opposite sides of the rotor. In such case, the pressure at an arbitrary location of one of externally pressurized gas bearing surfaces opposite to each other with respect to the rotor and the pressure at a location of the other of the externally pressurized gas bearing surfaces which is symmetrical to said arbitrary location about a point on the rotor may be measured by the pressure sensor to provide two measured values which are utilized to determine the displacement of the rotor in an axial direction.

By so setting the locations at which the pressure is measured, the displacement of the rotor in the axial direction can be measured accurately with a further minimized number of the pressure sensors and, and hence, at a further reduced cost.

In the combined externally pressurized gas and magnetic bearing assembly of any of the foregoing structures, the pressure sensor may positioned without being spaced from a pressure measuring point on the externally pressurized gas bearing surface. In other words, the pressure sensor may be fixed at or adjacent a location at which the pressure at the bearing surface of the externally pressurized gas bearing assembly is to be measured. By so positioning the pressure sensor, the pressure at the desired pressure measuring surface can be measured directly.

Also, in the combined externally pressurized gas and magnetic bearing assembly of any of the foregoing structures, instead of the pressure sensor being positioned at the measuring surface, the pressure sensor may be positioned spaced from the externally pressurized gas bearing surface, in which the pressure sensor and the externally pressurized gas bearing surface are to be communicated with each other by means of a micro-passage, a pipe or a combination of the micro-passage and the pipe. In this arrangement, the micro-passage, for example, is defined at the bearing surface of the externally pressurized gas bearing and is in the form of a hole of a diameter equal to or smaller than 1 mm. The pipe may be fluid-connected with the micro-passage and has an inner diameter equal to or smaller than 1 mm. The pressure sensor is fitted to one end of the pipe.

Where bearing surface of the externally pressurized gas bearing or the combined externally pressurized gas and magnetic bearing assembly itself is so small that the pressure sensor cannot be accommodated, or where an empty space is available within the spindle device utilizing the bearing assembly, the use of the micro-passage and/or the pipe is effective. Also, by choosing the diameter of the micro-passage defined at the bearing surface of the externally pressurized gas bearing for the pressure measurement to be equal to or smaller than 1 mm, any possible adverse influence on the externally pressurized gas bearing can be minimized and, by choosing the diameter of the pipe coupled with the micro-passage to be equal to or smaller than 1 mm, the pressure measurement is possible with no need to reduce the frequency characteristic.

In the combined externally pressurized gas and magnetic bearing assembly of any of the foregoing structure, the core of the electromagnet of the magnetic bearing may utilize a solid material. The use of the solid material for the core makes it easy to form the fluid restrictor such as the self-forming orifice and, therefore, the highly precise combined externally pressurized gas and magnetic bearing assembly can be assembled.

Instead of the core of the electromagnet being made of the solid material in its entirety, the core may have a portion thereof made of the solid material while the remaining portion of said core is made of a laminated silicon steel plate. The use of the laminated silicon steel plate makes it possible to reduce the core loss occurring at the core of the electromagnet while the use of the solid material facilitates formation of the fluid restrictor such as the self-forming orifice in the externally pressurized gas bearing.

Again, in the combined externally pressurized gas and magnetic bearing assembly of any of the foregoing structures, the rotor may utilize a laminated silicon steel plate and having a coating layer of a ceramic material formed on the eliminated silicon steel plate to a thickness equal to or smaller than 1 mm.

If the rotor is made of the laminated silicone steel plate, the core loss at the high speed rotation can be lessened to suppress emission of heat from the rotor during the high speed rotation thereof. In addition, the coating of the ceramic material on an outer peripheral surface of the rotor minimizes any possible damage to the rotor which would occur when the rotor is brought into contact with the bearing surface. Formation of the coating layer made of the ceramic material is effective to eliminate the occurrence of the core loss resulting from the magnetic fluxes emanating from the electromagnet of the magnetic bearing and hence, effective for the high speed rotation. Outer and inner peripheral surfaces of the coating layer serve a rotor surface of the externally pressurized gas bearing and a rotor surface of the magnetic bearing, respectively, and by adjusting the thickness of the coating layer, an optimum bearing gap of the externally pressurized gas bearing and an optimum bearing gap of the magnetic bearing can be fixed.

Alternatively, the rotor may utilize a soft magnetic solid material having a low thermal expansion coefficient, in which case the coating layer of the ceramic material is formed on the solid material to a thickness equal to or smaller than 1 mm. Where the rotor is provided on the main shaft, the main shaft is preferably made of the same solid material as the rotor. An example of the solid material that can be employed in the present invention includes invar.

The use of the solid material for the rotor is effective to increase the natural frequency of bending of the rotor to such an extent as to permit the rotor to be driven at a further high speed. In addition, even when the rotor is heated, a change of the bearing gap can be kept minimum because of the low thermal expansion coefficient exhibited by the solid material and, therefore, the stabilized performance of the externally pressurized gas bearing can be secured. Yet, since the amount of thermal expansion in the axial direction is minimum, the machining accuracy can be effectively increased if it is used in the main shaft of a machine tool.

In the combined externally pressurized gas and magnetic bearing assembly of any of the foregoing structures, a magnetic bearing control means may be employed for controlling the magnetic bearing on a feed-back scheme according to the value measured by the displacement measuring means, which magnetic bearing control means is operable to perform the control on an integral action or a proportional integral action and to effect no control to a high frequency higher than a predetermined value.

By performing the control on an integral action or a proportional integral action and effecting no control to a high frequency higher than a predetermined value, the magnetic bearing can be limited to exert the bearing force at the low frequency region without the dynamic stability, which is an advantage of the externally pressurized gas bearing, being adversely affected and, therefore, the static rigidity peculiar thereto can be increased. In other words, the externally pressurized gas bearing and the magnetic bearing can exhibit a dynamic rigidity (a high frequency region) and a static rigidity (a low frequency region), respectively, and therefore, the respective advantages of the magnetic bearing and the externally pressurized gas bearing can be retained to avoid any possible interference therebetween.

Where such magnetic bearing control means is employed, the use may be made of a linearizing circuit in an amplifier unit for processing an output from the displacement measuring means, so that a characteristic relationship between a control voltage and an electromagnetic force can be linearized without supplying a bias current to coils of an electromagnet of the magnetic bearing. The linearization of the characteristic relationship between the control voltage and the electromagnetic force can be accomplished by providing the amplifier unit with a current squaring feedback circuit.

By accomplishing the linearization with no need to supply the bias current, no negative rigidity peculiar to the magnetic bearing will be generated.

Also, a means for processing the value measured by the displacement measuring means may have an insensitive zone, so that the magnetic bearing control means will not control the magnetic bearing in the event that the displacement measured by the displacement measuring means is within a predetermined range. Means for providing the insensitive zone may be provided either in a front stage of the magnetic bearing control means separately from the magnetic bearing control means, or in the magnetic bearing control means.

In the event that the center of the magnetic bearing and the center of the externally pressurized gas bearing deviate slightly from each other because of a faulty adjustment of the displacement sensor, or in the event that a drift occurs in the displacement sensor in dependence on the temperature or the like, even though the rotor is kept in alignment with the center of the externally pressurized gas bearing, an electric current will flow through the coils of the magnetic bearing, thereby constituting an external disturbance to the externally pressurized gas bearing. The insensitive zone is utilized to eliminate this problem to thereby eliminate any possible interference from the magnetic bearing to the externally pressurized gas bearing, wherefore the stabilized combined externally pressurized gas and magnetic bearing assembly can be assembled.

In the case of the spindle device utilizing the combined externally pressurized gas and magnetic bearing assembly for rotatably supporting the main shaft having the rotor formed thereon, a control means may be used by which after the main shaft has been floated on a non-contact basis upon activation of the externally pressurized gas bearing during a start of the externally pressurized gas bearing, a direct current component of an output from the displacement measuring means being zeroed, followed by activation of the magnetic bearing. This control means may be implemented either by the magnetic bearing control means or by a means separate therefrom.

By driving this way, the temperature dependent drift of the sensor which serves as the displacement measuring means in the spindle device where the temperature tends to increase can be compensated for to avoid any possible erroneous operation of the magnetic bearing which exerts the electromagnetic force based on an output from the sensor.

Also, in the spindle device utilizing the combined externally pressurized gas and magnetic bearing assembly for rotatably supporting the main shaft having the rotor formed thereon, a control means may be used by which after the in shaft has been driven and floated on a non-contact basis upon activation of the externally pressurized gas bearing during a start of the externally pressurized gas bearing, a direct current component of an output from the displacement measuring means being zeroed when the main shaft attains a predetermined number of revolutions or higher, followed by activation of the magnetic bearing. This control means may be implemented either by the magnetic bearing control means or by a means separate therefrom. The number of revolutions of the rotor can be obtained from a rotation sensor suitably provided for.

Since when the spindle is driven at a high speed the pressure within the bearing gap of the externally pressurized gas bearing and a distribution of such pressure fluctuate, there is the possibility that the zero point of the pressure sensor may be slightly offset by the number of revolutions. If in such case the magnetic bearing is operated regularly, the predefined center of the magnetic bearing and the predefined center of the externally pressurized gas bearing may be displaced from each other within a relatively large rotational region and the direct current will flow to the electromagnet to rectify this displacement. The core loss will occur in the rotor as a result of the magnetic fluxed developed as a result of the flow of the direct current to the electromagnet, resulting in increase of the braking torque and emission of heat from the rotor to such an extent as to make it difficult to achieve a high speed rotation. Under normal conditions, it is suggested to increase the static rigidity of the magnetic bearing when rotation takes place at a rated number of revolutions or at a rate higher than the predetermined number of revolutions. In view of this, if within a predetermined rotational range, the center of rotation of the main shaft when only the externally pressurized gas bearing is activated is set to the zero point so that the magnetic bearing can be activated only when it falls within the predetermined rotational range, the rotor can be driven at a high speed. Accordingly, the spindle device utilizing this combined externally pressurized gas and magnetic bearing assembly can also be adapted for high revolution.

Yet, in the spindle device utilizing the combined externally pressurized gas and magnetic bearing assembly for rotatably supporting the main shaft having the rotor formed thereon, arrangement may be made that when the number of revolutions of the main shaft is detected as attaining a value higher than a predetermined value, the magnetic bearing control means causes a band eliminating filter to function. This system may be employed in the spindle device provided with the previously described control means at the start of the spindle device.

By inserting the band eliminating filter in a control system of the magnetic bearing which matches with the number of revolutions of the main shaft at a speed higher than the predetermined number of revolutions, a synchronizing component of the rotation of the main shaft, which forms a principal noise component of the displacement measuring means, can be eliminated to thereby limit the operation of the magnetic bearing to the low frequency. By suppressing the control at the high frequency region which is unnecessary to the magnetic bearing, the consumption of the electric power can be minimized advantageously.

Moreover, in the spindle device utilizing the combined externally pressurized gas and magnetic bearing assembly for rotatably supporting the main shaft having the rotor formed thereon, arrangement may be made that a control gain of the magnetic bearing can be lowered during a low speed rotation, but is varied to a predetermined value when the number of revolutions of the main shaft attains a value higher than a predetermined value. This setting and change of the control gain may be implemented by, for example, the previously discussed magnetic bearing control means.

Since the magnetic bearing is activated with the gain lowered in this way, any possible external disturbance to the main shaft and the rotor at the moment the magnetic bearing is activated can be suppressed advantageously. Even the setting and change of this control gain may be implemented in the spindle device of any of the previously described structures.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A first preferred embodiment of the present invention will now be described with particular reference to FIGS. 1 to 3.

Figure 1:
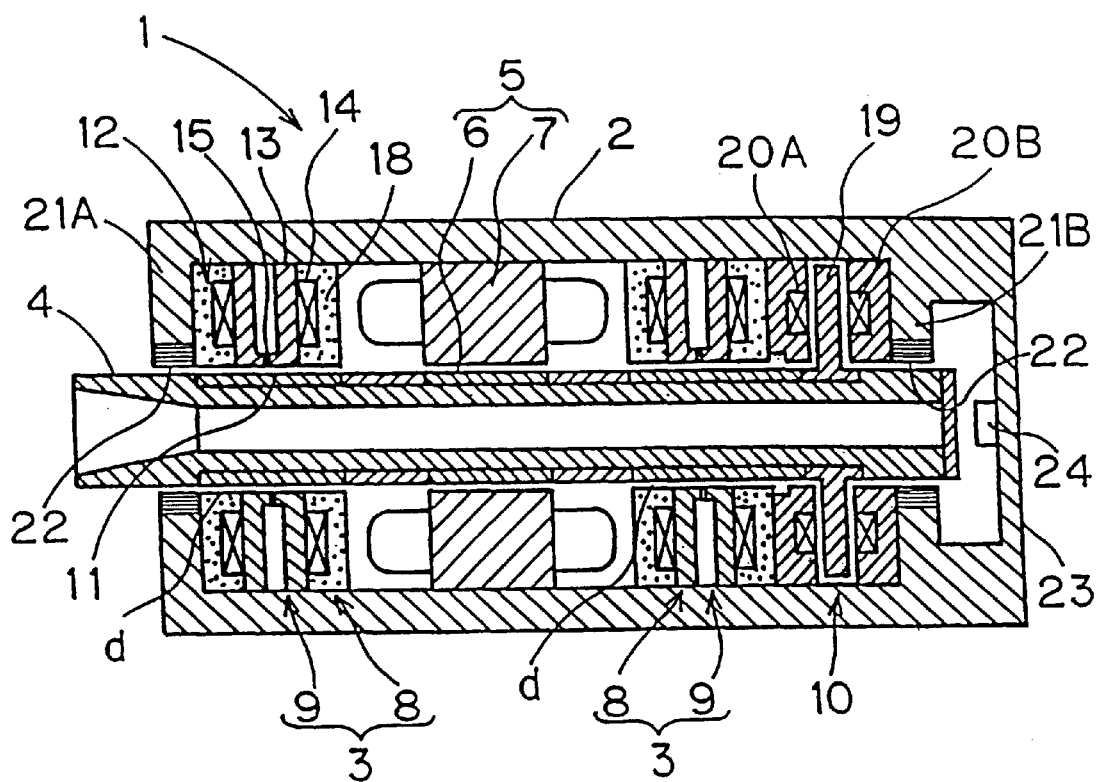
FIG. 1 is a schematic longitudinal sectional view of a spindle device utilizing a combined externally pressurized gas and magnetic bearing assembly according to a first preferred embodiment of the present invention.
Figure 2:
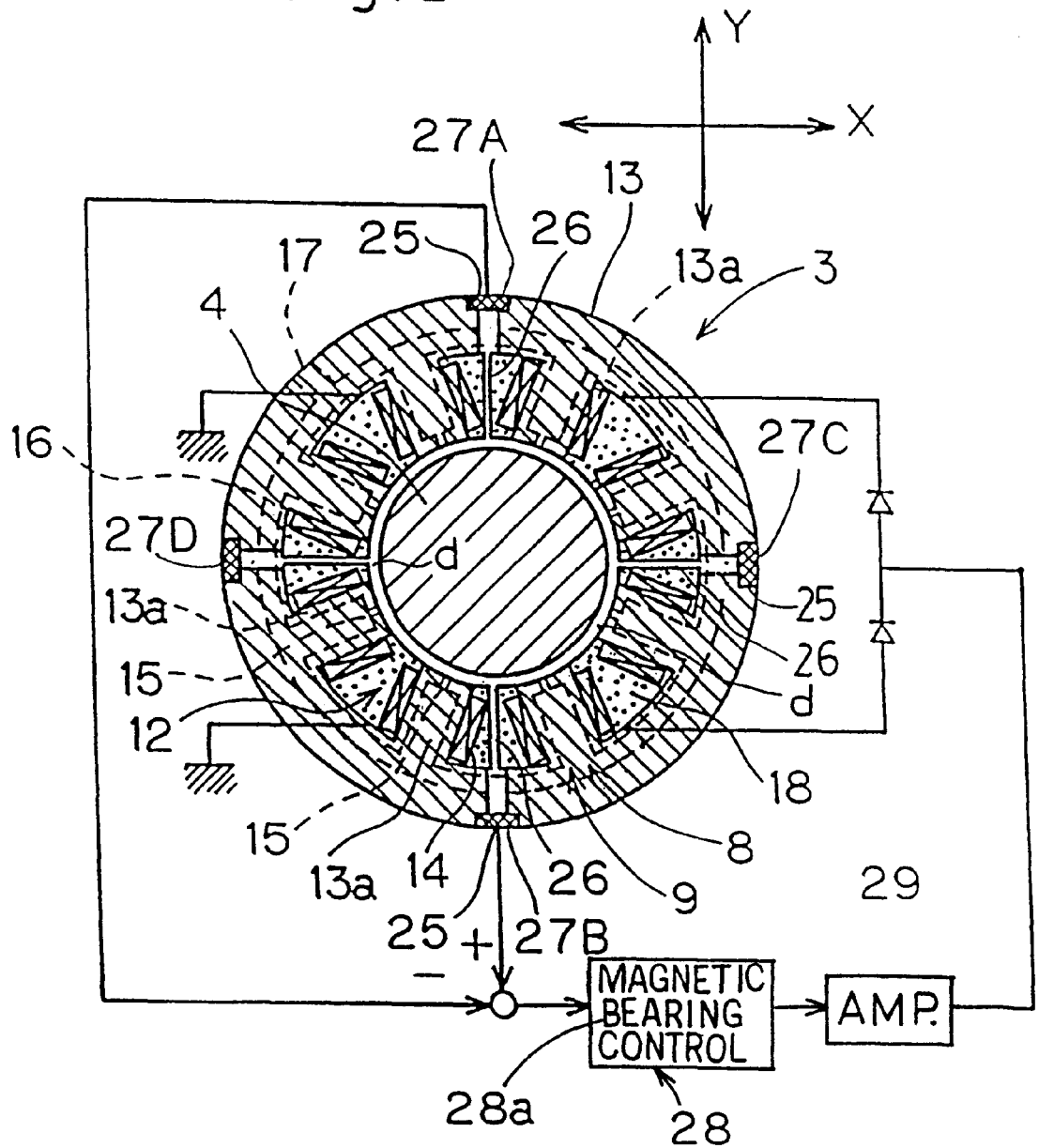
FIG. 2 is a schematic transverse sectional view of the combined externally pressurized gas and magnetic radial bearing assembly of FIG. 1, shown together with a bearing control system.

FIG. 1 illustrates, in a schematic longitudinal sectional representation, a spindle device utilizing a combined externally pressurized gas and magnetic bearing assembly according to this embodiment of the present invention. The spindle device 1 employing the combined externally pressurized gas and magnetic bearing assembly represents a spindle device of a built-in motor type used in a machine tool and comprises a generally cylindrical housing 2 which serves as a spindle support. The housing 2 accommodates therein a main shaft 4, a drive motor 5 mounted around the main shaft 4, a combined externally pressurized gas and magnetic being assembly 3 mounted around the main shaft 4 and positioned on each side of the drive motor 5, and an axial magnetic bearing 10 positioned adjacent a rear end of the housing 2. The main shaft 4 is rotatably supported by the front and rear combined externally pressurized gas and magnetic bearing assemblies 3 and the axial magnetic bearing 10. The drive motor 5 comprises a rotor 6 integral with the main shaft 4 and a stator 7 directly coupled with the housing 2.

The housing 2 has front and rear radial flanges 21A and 21B formed integrally therewith at front and rear end portions thereof, leaving respective axial openings through which the main shaft 4 extends rotatably. The peripheral wall defining each opening in the corresponding radial flange 21A and 21B forms a protective bearing face 22 made of material having an excellent lubrication and, therefore, even when the main shaft 4 is touched down as a result of abnormality in the combined externally pressurized gas and magnetic bearing assemblies 3, seizure of the main shaft 4 can be prevented.

The axial magnetic bearing 10 includes a bearing rotor 19 formed integrally with the main shaft 4, and two bearing stators 20A and 20B accommodated within the housing 2 and positioned on respective sides of the bearing rotor 19 so as to substantially sandwich the bearing rotor 19 from axial directions opposite to each other. An electric current supplied through respective windings of the bearing stators 20A and 20B is controlled according to a value detected by a axial displacement sensor 24 for detecting an axial displacement of the main shaft 4. This axial displacement sensor 24 is fitted to a rear end wall 23 of the housing 2.

Each of the front and rear combined externally pressurized gas and magnetic bearing assemblies 3 is of a design in which a radial magnetic bearing 8 and a radial externally pressurized gas bearing 9 such as an air bearing are integrated together in a manner, which will subsequently be described, so that some of component parts of one of the radial magnetic bearing 8 and the radial externally pressurized gas bearing 9 can concurrently serve as component parts of the other of the radial magnetic bearing 8 and the radial externally pressurized gas bearing 9.

Specifically, the radial magnetic bearing 8 includes a bearing rotor 11 made of a magnetizable material and mounted around the main shaft 4, and a bearing stator 12 secured to the housing 2. The bearing stator 12 fast with the housing 2 is formed in a substantially ring-shaped configuration and includes a core 13, coils 14 and a coil covering 18. The bearing stator core 13 is made of a soft magnetic solid material having a high specific resistance. As shown in FIG. 2, the core 13 is of a structure having a ring-shaped body from which a plurality of yokes 13a protrude radially inwardly, and the coils 14 are wound around the respective yokes 13a. A gap between the immediately neighboring yokes 13a is filled up by the core covering 18 which may be a molded synthetic resin or a filler, made of a non-magnetizable metallic material or a ceramics material, or which may be a partition wall formed by thermally spraying a non-magnetizable metallic material or a ceramics material. The core covering 18 has a radial inner face held in flush with the circle occupied by respective radial inner faces of the yokes 13a. The core covering 18 and the yokes 13a altogether form a cylindrical radial inner surface of the bearing stator 12.

The ring-shaped body of the bearing stator core 13 has an air passage 16 defined therein so as to extend circumferentially thereof This air passage 16 has branch passages equal in number to the number of the yokes 13a and communicated with respective fluid restrictors 15 each opening at the radial inner face of the corresponding yoke 13a. Each of the fluid restrictors 15 may be in the form of a self-forming orifice. The air passage 16 also has one or more intake ports 17 defined somewhere on its periphery, which ports 17 are communicated with a fluid source (not shown) of fluid under pressure, for example, a compressed air by means of any suitable piping. The compressed air from the fluid source can be jetted through the orifices 15 into a bearing gap d defined between an peripheral surface of the main shaft 4 and an inner peripheral surface of the bearing stator 12.

The orifices 15, the bearing stator core 13 concurrently serving as a bearing gap defining member, and the core covering 18 altogether form the radial externally pressurized gas bearing 9. Also, the bearing stator core 13 concurrently serves as a member for defining both of the orifices 15 and the air passage 16.

With this construction, the externally pressurized gas bearing 9 can be disposed and, hence, accommodated within the axial width of the magnetic bearing 8 as measured in a direction axially of the main shaft 4. In addition, since the gap of the magnetic bearing is represented by the gap between the bearing stator core 13 and the main shaft 4, the bearing gap d of the externally pressurized gas bearing 9 and the gap of the magnetic bearing 8 are defined at the same position with respect to the axial direction of the main shaft 4.

Figure 3:
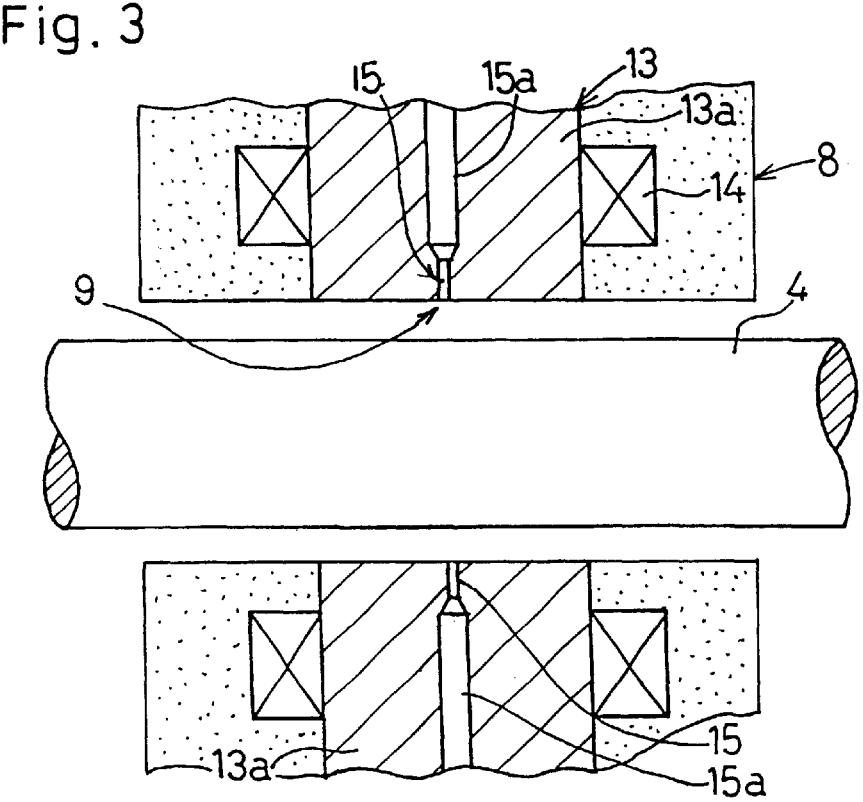
FIG. 3 is a fragmentary longitudinal sectional view, on an enlarged scale, showing a portion of the combined externally pressurized gas and magnetic radial bearing assembly.

As shown in FIG. 3, each of the orifices 15 is in the form of a self-forming orifice and is comprised of an air conduit 15a, defined in the core 13, and a bearing gap d. The air conduit 15a has an inner peripheral wall stepped to provide large and reduced diameter portions on respective sides of the step, said reduced diameter portion being formed into a micro-passage that opens at the externally pressurized gas bearing surface delimited by the inner surface of the core 13. The micro-passage has a diameter equal to or smaller than 1 mm. Where the self-forming orifice 15 is employed for an air jetting system of the externally pressurized gas bearing, the stability against a pneumatic hammer can be increased together with increase in bearing stability at the high frequency region, that is, in dynamic rigidity. It is to be noted that the number of the orifices 15 is preferably at least three, in which case the orifices 15 are equidistantly spaced in a direction circumferentially of the main shaft 4.

Figure 4:
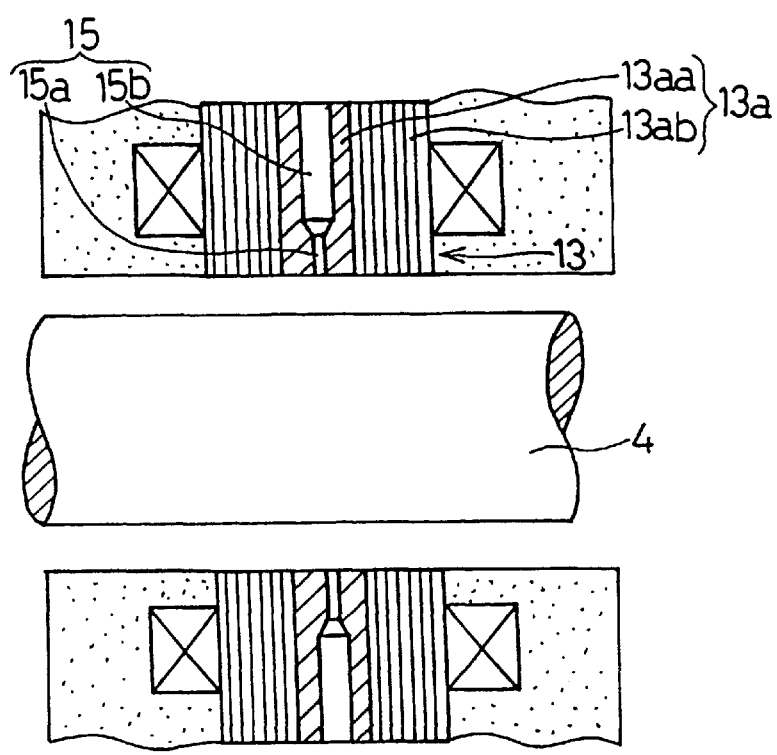
FIG. 4 is a fragmentary longitudinal sectional view, on an enlarged scale, showing a modified form of yokes employed in the combined externally pressurized gas and magnetic radial bearing assembly.

It is to be noted that although in the illustrated embodiment the yokes 13a are made of a solid material in its entirety, each of the yokes 13a may be made in part of a solid material and in part of a laminated silicon steel material. More specifically, as shown in FIG. 4, a portion 13aa of each of the yokes 13a adjacent and around the respective orifice 15 may be made of the solid material while the other portion 13ab thereof remote from the respective orifice 15 is made of the laminated silicon steel material. In either case, since the tapered orifice which is the micro-hole is defined by the solid material, as compared with the case in which each orifice is formed in the respective core made of the customarily employed laminated steel material, the micro-hole can easily be formed and, therefore, the externally pressurized gas bearing can be formed accurately and precisely. Also, where the laminated silicon steel material is employed for that portion of each yoke 13a other than the portion 13aa adjacent and around the associated orifice 15 such as shown in FIG. 4, the core loss induced in the cores 13 can be lessened as compared with that in the case where the cores 13 are made of the solid material in their entirety.

The combined externally pressurized gas and magnetic bearing assembly 3 described above is of a structure in which the externally pressurized gas bearing 9 and the magnetic bearing 8 are combined together and, therefore, the combined externally pressurized gas and magnetic bearing assembly 3 has both an excellent dynamic rigidity generally possessed by the externally pressurized gas bearing 9 and an excellent static rigidity possessed by the magnetic bearing 8.

In addition, since the externally pressurized gas bearing 9 and the magnetic bearing 8 forming the combined externally pressurized gas and magnetic bearing assembly 3 make use of component parts common to both of them, not only can the structure as a whole be made compact, but also the required length of the main shaft 4 can advantageously be reduced, as compared with the case in which an externally pressurized gas bearing and a magnetic bearing are individually arranged in an axial direction of the main shaft. For this reason, the natural frequency of bending can be increased and a high speed rotation can be attained. In particular, since in the illustrated embodiment of the present invention, the bearing stator core 13 and the core covering 18 of the magnetic bearing 8 altogether form the bearing gap forming member of the externally pressurized gas bearing 9 and the bearing stator core 13 concurrently form the member for defining the orifices 15 and the air passage 16, the component parts can be highly used concurrently, rendering the structure to be more compact.

A control system for the combined externally pressurized gas and magnetic bearing assembly 3 will now be described. The bearing stator 12 shown in FIG. 2 has four pressure sensing air holes 26 defined therein so as to extend radially thereof at respective locations adjacent the orifices 15 and spaced an equal distance from each other in a direction circumferentially thereof. The pressure sensing air holes 26 have one end extending radially inwardly through the core covering 18 so as to open in communication with the bearing gap d and the opposite end radially outwardly of the one end and enlarged to define a sensor mounting hole 25 for accommodating a respective pressure sensor 27A, 27B, 27C and 27D. Radially opposed members of those pressure sensors 27A to 27D are paired to form a differential air microsensor for detecting a radial displacement of the main shaft 4. In the illustrated embodiment, the pressure sensors 27A and 27B opposed radially with respect to each other form an Y-axis sensor pair and the pressure sensors 27C and 27D similarly opposed radially with respect to each other form an X-axis sensor pair.

The Y-axis sensor pair including the pressure sensors 27A and 27B serves to detect a pressure difference at respective portions of an externally pressurized gas bearing surface where the air holes 26 associated with the respective pressure sensors 27A and 27B open and then to convert the detected pressure difference into a displacement of the main shaft 4 in a Y-axis direction of the main shaft 4. On the other hand, the X-axis sensor pair including the pressure sensors 27C and 27D serves to detect a pressure difference at respective portions of the externally pressurized gas bearing surface where the air holes 26 associated with the respective pressure sensors 27C and 27D open and then to convert the detected pressure difference into a displacement of the main shaft 4 in another radial direction of the main shaft 4 perpendicular to such one radial direction, that is, an X-axis direction as shown in FIG. 2.

A magnetic bearing control means 28 including a controller 28a, an amplifier 29 and others includes a feedback control system in both of the Y-axis and X-axis directions. The Y-axis direction feedback control system of the magnetic bearing control means 28 performs a feedback control of the magnetic bearing 8 in the Y-axis direction based on the displacement of the main shaft 4 in the Y-axis direction detected by the pressure sensors 27A and 27B. In other words, in dependence on the displacement of the main shaft 4, an electric current supplied through the amplifier 29 to the coils 14 corresponding in position to the pressure sensors 27A and 27B, or the coils 14 adjacent thereto, is adjusted to inhibit the main shaft 4 from being biased in the Y-axis direction, that is, to control to bring the main shaft 4 into alignment with a target position. Similarly, the X-axis direction feedback control system of the magnetic bearing control means 28 performs a control of the electric current to be supplied to the selected coils 14 in dependence on the displacement of the main shaft 4 in the X-axis direction detected by the pressure sensors 27C and 27D.

Since as discussed above the air microsensor system is employed in which the pressure sensors 27A to 27D for detecting an externally pressurized gas present in the bearing gap d are employed as a displacement sensor for the magnetic bearing 8, matching of a zero point (a target value) of the control system for the magnetic bearing 8 with the center of support (a point of pressure equilibrium) of the externally pressurized gas bearing 9 can easily be achieved, requiring no complicated sensor adjustment. Also, a problem associated with both variation in magnetic property and error in roundness of a rotor sensor target surface, which is found in any other system, does not matter.

Figure 5:
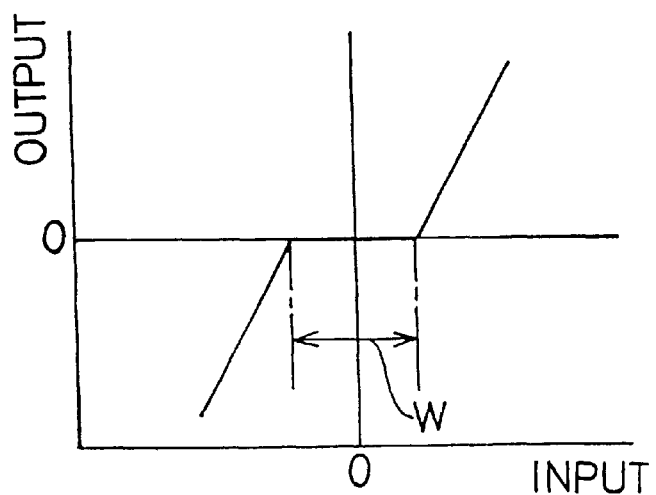
FIG. 5 is an explanatory diagram showing an example of an electric current control having an insensitive zone employed in the combined externally pressurized gas and magnetic radial bearing assembly.
Figure 6:
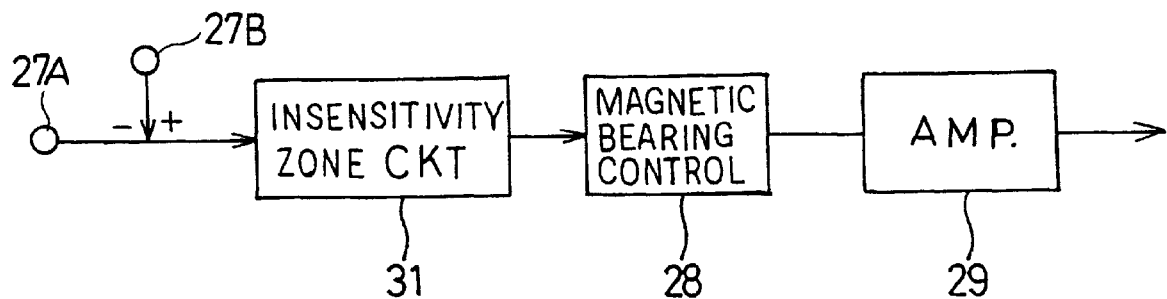
FIG. 6 is a circuit block diagram showing a modified form of a control system for the combined externally pressurized gas and magnetic radial bearing assembly.

The feedback control by the magnetic bearing control means 28 is based on the integral action or the proportional integral action and does not perform a compensation at a high frequency. Also, where the zero point (X=0,Y=0) of the magnetic bearing control system and the center of support of the externally pressurized gas bearing 9 displace relative to each other due to a drift of any one of the pressure sensors 27A and 27B, a slight insensitivity zone w (FIG. 5) may be provided in the integral control. The insensitivity zone w may be defined by providing an insensitivity zone circuit 31, as shown in FIG. 6, between the pressure sensors 27A and 27B and the magnetic bearing control means 28, or by providing an insensitivity zone circuit within a control circuit forming the magnetic being control means 28. By so employing the insensitivity zone w, an erroneous operation of the magnetic bearing 8 resulting from a temperature-dependent drift or the like can be suppressed. In other words, role sharing in which the dynamic rigidity (the high frequency region) and the static rigidity (the low frequency region) can be shared by the externally pressurized gas bearing 9 and the magnetic bearing 8, respectively, can be carried out assuredly and, hence, the respective advantages of the magnetic bearing 8 and the externally pressurized gas bearing 9 can be retained to avoid any possible interference therebetween. In addition, since as described above the magnetic bearing 8 provides a low frequency control system based on the integral action or the proportional integral action, the pressure sensors 27A to 27D each having a relatively low response characteristic can advantageously be employed as a displacement sensor.

The performance of the magnetic bearing 8 can be determined by setting of the magnetic bearing control means 28. However, in the case of the magnetic bearing in general, a difficulty has been encountered to effectively generate an attenuating force at a high frequency region to stably support the main shaft in a floated fashion. Accordingly, in the present invention, the magnetic bearing 8 is utilized only for the purpose of increasing the bearing rigidity in the low frequency region which is an advantage of the magnetic bearing.

The amplifier 29 for supplying an electric current to the coils 14 of the magnetic bearing 8 makes use of a linearizing circuit, for example, that having a current squaring feedback circuit, for establishing a linear relationship between the control voltage and the electromagnetic force. The use of the linearizing circuit in the amplifier 29 is effective in that the linear relationship between the control voltage and the electromagnetic force can be attained with no need to supply the bias current. Accordingly, the possibility of a negative rigidity peculiar to the magnetic bearing 8 can advantageously be avoided and, hence, the possibility can also be avoided which the externally pressurized gas bearing 9 may lose a stability due to the negative rigidity. Also, the core loss which would be generated within the main shaft 4 by the effect of the bias current when the main shaft 4 rotates can be eliminated, making it possible to allow the main shaft 4 to be driven at a high speed.

Figure 7:
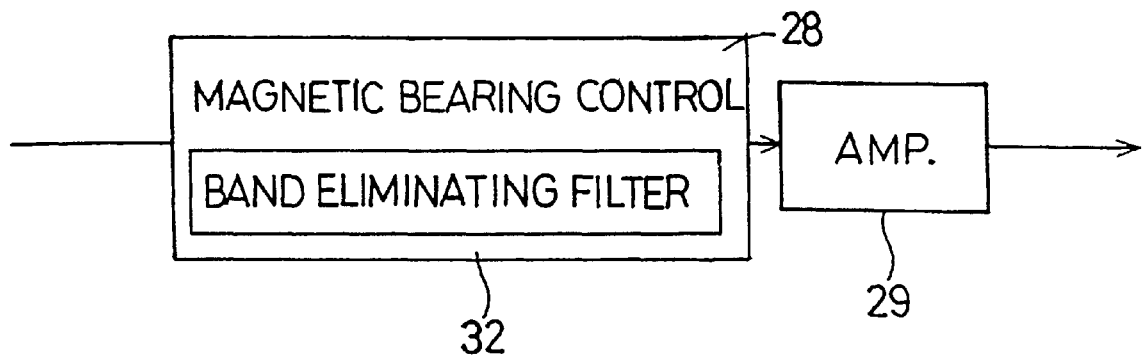
FIG. 7 is a circuit block diagram showing a further modified form of the control system for the combined externally pressurized gas and magnetic radial bearing assembly.

The magnetic bearing control means 28 may include a band eliminating filter 32 (FIG. 7) synchronized with the number of revolutions of the main shaft 4. The use of the band eliminating filter 32 is effective to prevent an electromagnetic force from the electromagnet of the magnetic bearing 8 from acting on oscillation of the main shaft 4 which would result from imbalance of rotation of the main shaft 4. As hereinbefore discussed, where the magnetic bearing control means 28 is so constructed as to perform the integral action, a force of action of the magnetic bearing 8 at the high frequency region acts as an instable force on the main shaft 4. During rotation of the main shaft 4, oscillation of the main shaft 4 has a rotational synchronizing component as a main oscillation component. By selectively eliminating it, it is possible to rotate the main shaft 4 in a stabilized fashion.

It is to be noted that although in the illustrated embodiment the pressure sensors 27A to 27D are used to directly detect the displacement of the main shaft 4, control may be effected by the magnetic bearing control means 28 according to the size of the gap between the main shaft 4 and the externally pressurized gas bearing surface that is determined by converting respective detection values of the pressure sensors.

Also, instead of disposing the pressure sensors inside the core 13 of the magnetic bearing 8 in the manner described hereinbefore, a hollow pipe (not shown) may be disposed in communication with the bearing gap of the externally pressurized gas bearing 9 so that the pressure can be measured by an external pressure sensor. Where the bearing size is small and an outside space is available for installation of the pressure sensor, the disposition of the pressure sensor in such outside space is preferred.

Figure 8:
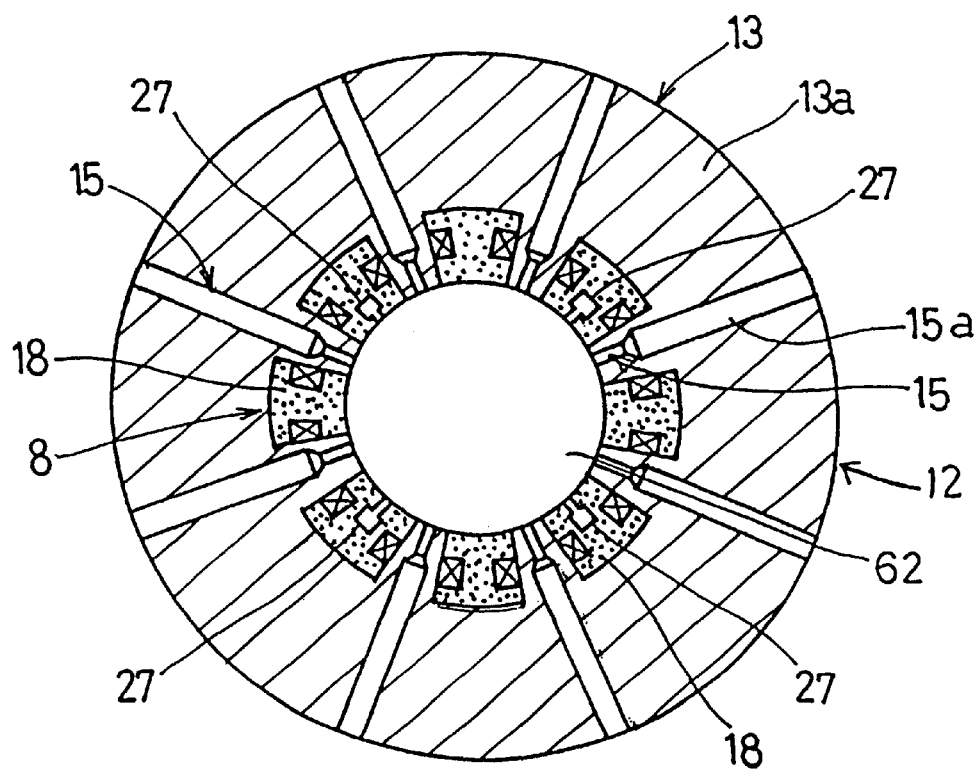
FIG. 8 is a schematic transverse sectional view of the combined externally pressurized gas and magnetic radial bearing assembly according to a second preferred embodiment of the present invention.

In addition, as is the case with the second embodiment of the present invention as shown in FIG. 8, the pressure sensor 27 may be disposed directly within the inner diameter of the magnetic bearing 8, for example, within the core covering 18 or the like for measuring the pressure between the main shaft 4 and the core 13 so that the measured pressure can be converted into the displacement of the main shaft 4.

Figure 9:
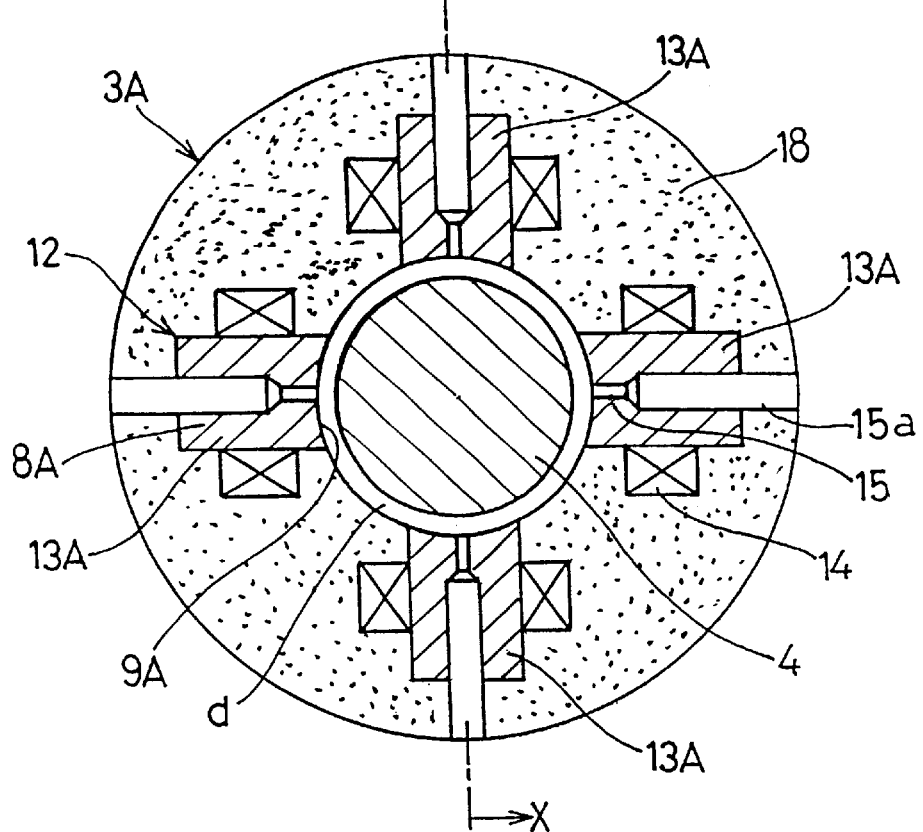
FIG. 9 is a schematic transverse sectional view of the combined externally pressurized gas and magnetic radial bearing assembly according to a third preferred embodiment of the present invention.
Figure 10:
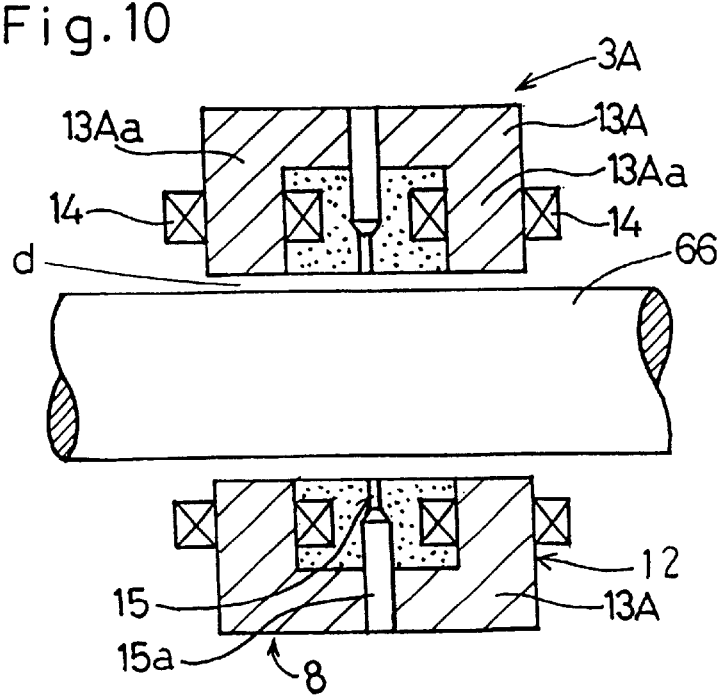
FIG. 10 is a fragmentary longitudinal sectional view of the combined externally pressurized gas and magnetic radial bearing assembly shown in FIG. 9.

FIGS. 9 and 10 illustrate the combined externally pressurized gas and magnetic bearing assembly according to a third preferred embodiment of the present invention. In this embodiment, the combined externally pressurized gas and magnetic bearing assembly 3A of a type in which the orifices 15 for jetting a pressurized fluid medium into the bearing gap d of the externally pressurized gas bearing 9A are formed within the respective stator cores 13A of the radial magnetic bearing 8A makes use of the stator cores 13A of the electromagnets of the radial magnetic bearing 8 which are of a generally horseshoe shape with pairs of their magnetic poles 13Aa and 13Ab arranged in side-by-side fashion in a direction axially of the main shaft 4. The magnetic poles 13Aa occupying the same axial position along the main shaft 4 have the same polarity. By so doing, the core loss generated in the main shaft 4 as a result of rotation of the main shaft 4 can advantageously reduced. Other structural features and effects brought about by the third embodiment of the present invention are similar to those by the first embodiment of the present invention. The number of the stator cores 13A and, hence, the number of the electromagnets is preferred to be three or more in a circumferential direction of the main shaft 4.

As discussed above, by employing the three or more electromagnets forming component parts of the magnetic bearing 8A and disposing the magnetic poles 13Aa of the stator cores 13A of the respective electromagnets in the axial direction of the main shaft 4 with the magnetic poles 13Aa in each circumferential row having the same polarity, the loss of hysteresis and the loss of eddy current which would be brought about at the main shaft 4 of the magnetic bearing 8A incident to rotation of the main shaft 4 can be reduced advantageously. Also, since emission of heat from the main shaft 4 resulting from those losses can be suppressed, reduction in size of the bearing gap which would be brought about by a thermal expansion of the main shaft 4 can be minimized to allow the externally pressurized gas bearing 9A to exhibit a stabilized performance.

Figure 11:
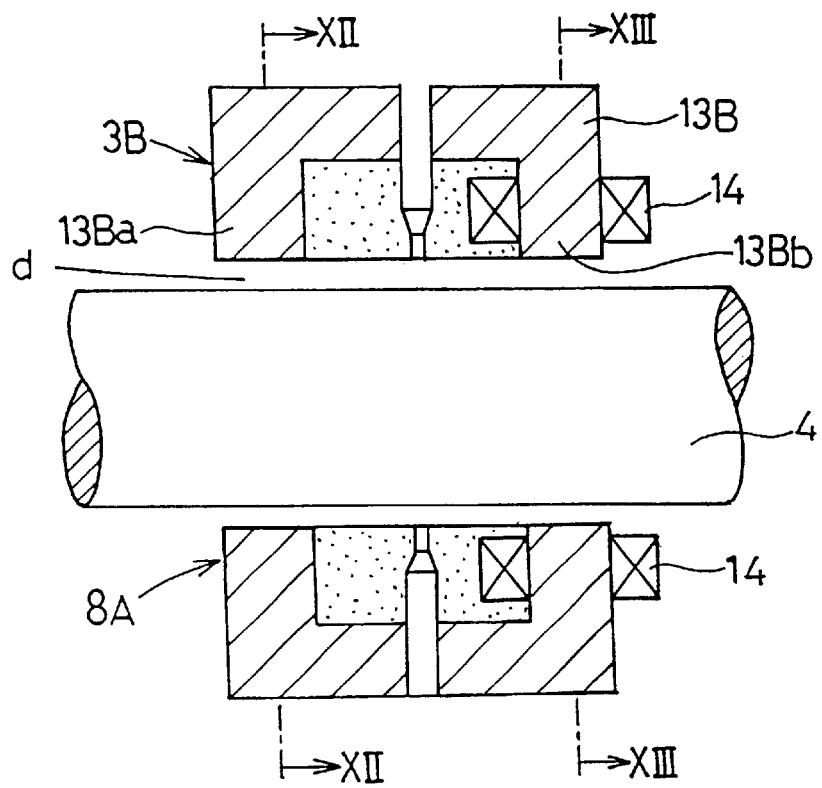
FIG. 11 is a schematic longitudinal sectional view of the combined externally pressurized gas and magnetic radial bearing assembly according to a fourth preferred embodiment of the present invention.
Figure 12:
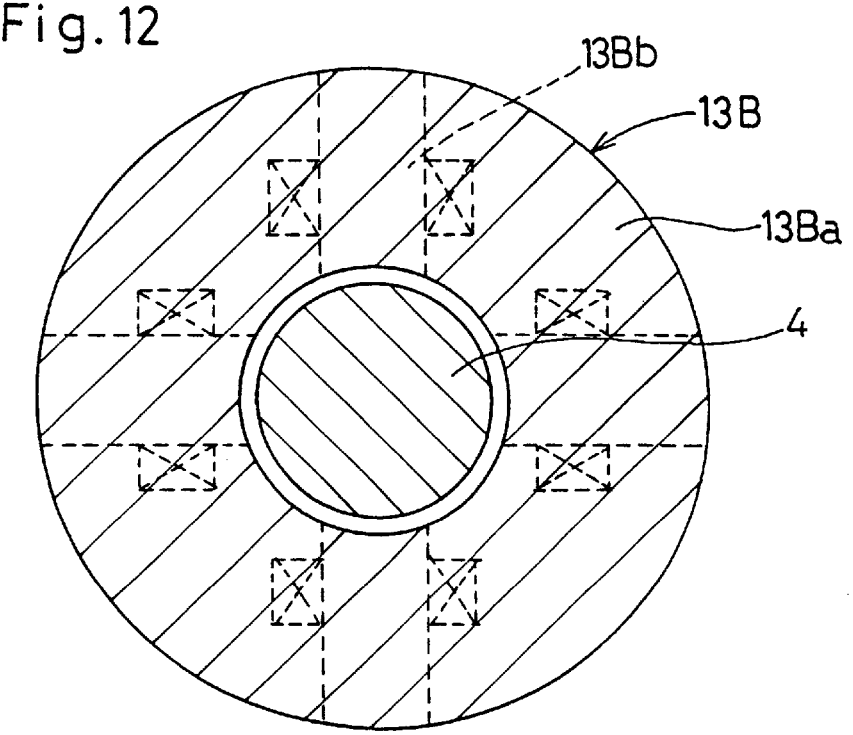
FIG. 12 is a cross sectional view taken along the line XII—XII in FIG. 11.
Figure 13:
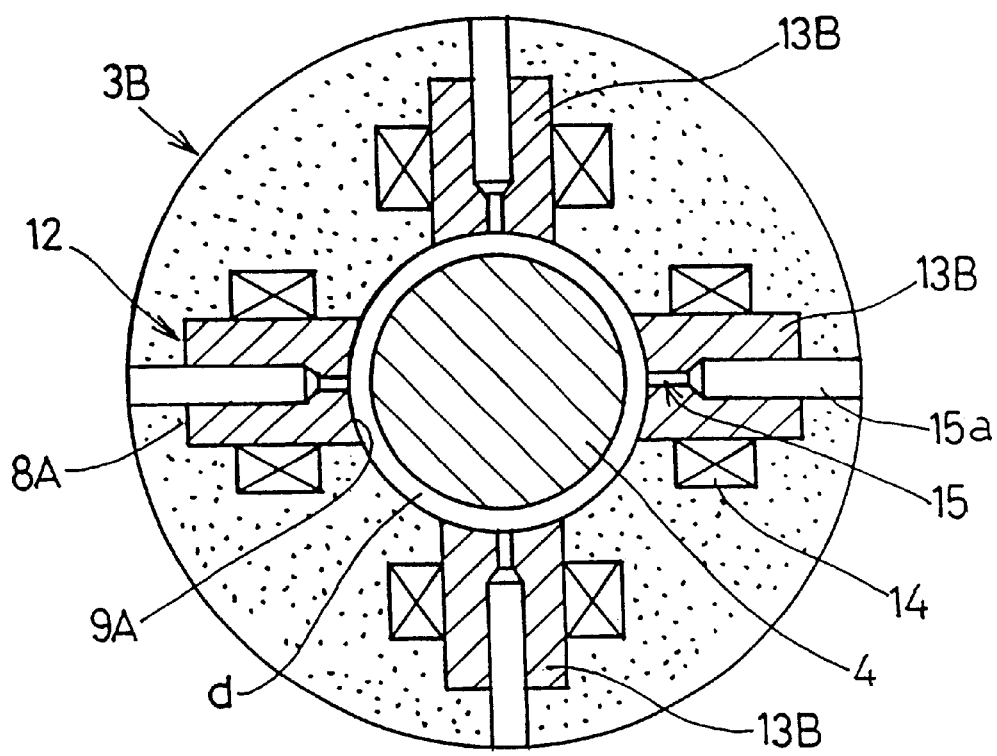
FIG. 13 is a cross sectional view taken along the line XIII—XIII in FIG. 11.

FIGS. 11 to 13 illustrates the combined externally pressurized gas and magnetic bearing assembly 3B according to a fourth preferred embodiment of the present invention. According to this fourth embodiment of the present invention, in contrast to the example shown in FIGS. 9 and 10, the radial magnetic bearing 8A has stator cores of an improved shape. More specifically, of the yokes 13Ba and 13Bb of the cores 13B disposed axially of the main shaft 4, the yoke 13Ba is commonly shared by the circumferentially neighboring yoke to thereby simplify the structure. By so constructing the electromagnet, machining steps required to form the yokes 13B of the electromagnet can be reduced to thereby increase the machinability and, at the same time, the core loss at the main shaft portion of tile magnetic bearing which results from rotation of the main shaft 4 can be reduced to permit the main shaft 4 to be rotated at a high speed.

Figure 14:
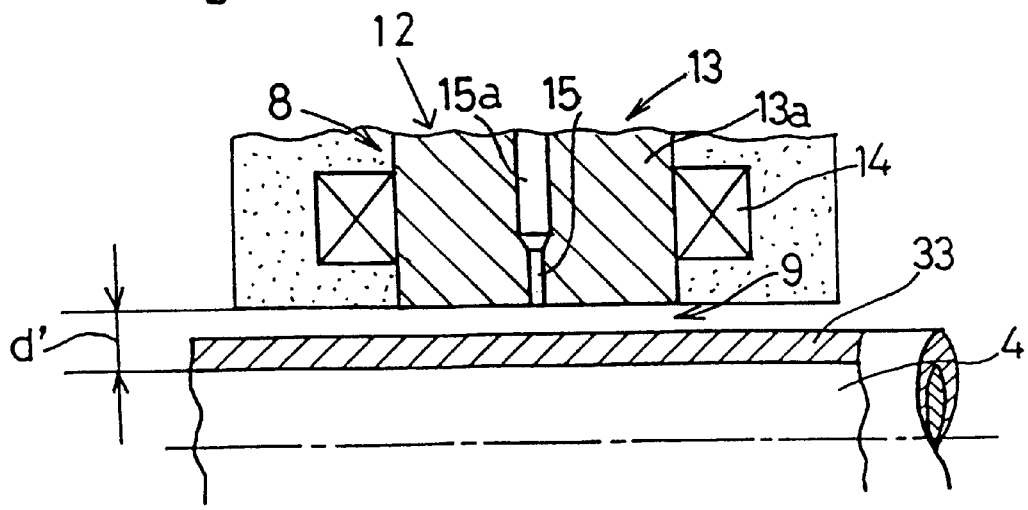
FIG. 14 is a fragmentary sectional view of the combined externally pressurized gas and magnetic radial bearing assembly according to a fifth preferred embodiment of the present invention.

FIG. 14 illustrates a fifth preferred embodiment of the present invention in which a coating layer 33 of a ceramic material is formed on a surface portion of the bearing 3. The ceramic coating layer 33 is effective to avoid any possible seizure of the bearing surface and the main shaft 4 during the touchdown. Also, since the coating layer 33 is made of the ceramic material, the core loss which would occur within the main shaft 4 when the main shaft 4 rotates to during operation of the magnetic bearing 8 can be suppressed to permit the main shaft 4 to be driven at a high speed. Also, not only because the coating layer 33 has an outer peripheral surface serving as a rotor surface for the externally pressurized gas bearing 9 and also has an inner peripheral surface serving as a rotor surface for the magnetic bearing 8, but also because the externally pressurized gas bearing gap and the magnetic bearing gap differ in size from each other, adjustment of the thickness of the coating layer 33 is effective to adjust the size of the gap of each of the externally pressurized gas bearing 9 and the magnetic bearing 8 to a respective optimum value. If expansion of the magnetic bearing gap d' is limited by selecting the thickness of the coating layer 33 to a value equal to or smaller than 1 mm, a desired electromagnetic force can be produced with no need to increase the electric current to be supplied to the coils 14.

In addition, a laminated silicon steel plate (not shown) may be employed in a rotor portion of the magnetic bearing 8 around the main shaft 4, in which case the ceramic coating layer 33 may be formed thereon. The rotor portion including the laminated silicon steel plate may be provided on, for example, an outer periphery of the main shaft 4. In such case, the use of the laminated silicon steel plate is effective to further decrease the core loss during a high speed rotation to thereby suppress emission of heat from the rotor during the high speed rotation.

It is also preferred that a soft magnetic material of a low coefficient of thermal expansion such as, for example, invar is used as material for the main shaft 4 or material for the rotor portion which may be disposed around the outer periphery of the main shaft 4 as discussed above and the ceramic coating layer 33 is formed on an outer peripheral surface thereof By so doing, the natural frequency of bending of the main shaft 4 or the rotor can be increased and, therefore, the main shaft 4 can be driven at a higher speed. Also, since the invar material has a low thermal expansion coefficient, the amount of reduction of the bearing gap d' which would result from thermal expansion of the main shaft 4 can be minimized even though increase of the temperature may take place in the main shaft 4. Also, the invar material has a magnetic property feasible to the magnetic bearing 8. For this reason, the externally pressurized gas bearing can exhibit a stabilized performance. Moreover, the amount of thermal expansion in a direction axially of the main shaft 4 is so small that when the invar material is sued in the spindle device for a machine tool, the machining accuracy can be increased effectively. In addition, considering that the ceramics in general has a low thermal expansion coefficient, application of the ceramic coating layer 33 on the main shaft 4 which is made of, for example, stainless steel of a ferrite system would bring about such a problem that due to the difference between the thermal expansion coefficient of the ceramic coating layer 33 and that of the main shaft 4 the ceramic coating layer 33 will be susceptible to cracking and/or separation from the main shaft 4, but the use of the invar material is effective to eliminate such problem.

It is to be noted that although in any one of the first to fifth embodiments of the present invention the orifices 15 have been formed in the bearing stator core 13, the orifices 15 may be formed in the coil covering 18 or any other component part, avoiding the bearing stator core 13.

Also, although in any one of the foregoing embodiments of the present invention, the component parts have been concurrently employed for both of the magnetic bearing 8 and the externally pressurized gas bearing 9, the magnetic bearing and the externally pressurized gas bearing may not necessarily employ the commonly shared component parts and the externally pressurized gas bearing may be provided within the axial width of the magnetic bearing or the magnetic bearing may be provided within the axial width of the externally pressurized gas bearing. Alternatively, the bearing gap d of the externally pressurized gas bearing 9 and the gap between the shaft of the magnetic bearing 8 and the stator core may be defined at the same position in a direction axially with respect to each other.

Figure 15:
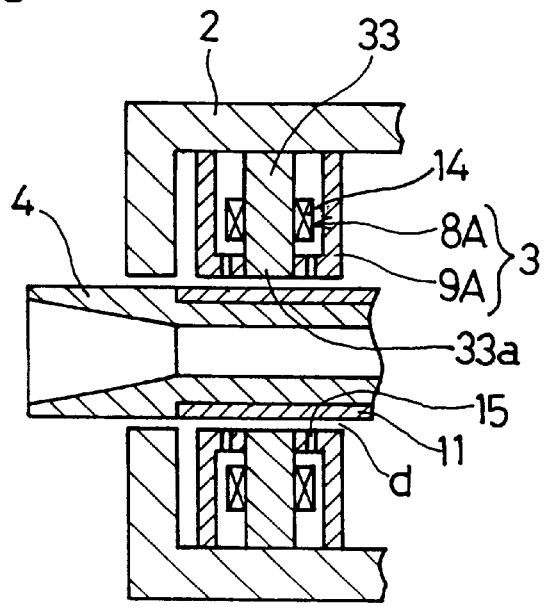
FIG. 15 is a fragmentary longitudinal sectional view of the combined externally pressurized gas and magnetic radial bearing assembly according to a sixth preferred embodiment of the present invention.

FIG. 15 illustrates a sixth preferred embodiment of the present invention. The spindle device 1 shown therein makes use of an externally pressurized gas bearing 9A made of non-magnetizable material and having defined therein an inner cavity in which a stator core 33 having the same front elevational shape as that of the stator core 13 shown in FIG. 2 is disposed. The stator core 33 has a plurality of radially inwardly protruding yokes 33a around which the respective coils 14 are wound, and extend radially inwardly through a radial inner wall of the externally pressurized gas bearing 9A with respective radial inner faces of the yokes 33a consequently positioned adjacent the outer periphery of the bearing rotor 11. The externally pressurized gas bearing 9A has its inner peripheral wall formed with a plurality of orifices 15 for jetting a compressed air into the bearing gap d. By this design, a magnetic bearing 8A is positioned within the axial width of the externally pressurized gas bearing 9A. Although the magnetic bearing 8A and the externally pressurized gas bearing 9A do not have the commonly shared component parts, the bearing gap of the externally pressurized gas bearing 9A and the gap between the bearing rotor 11 and the stator core 33 of the magnetic bearing 8A are thus defined at the same position with respect to the axial direction f the main shaft 4.

Figure 16:
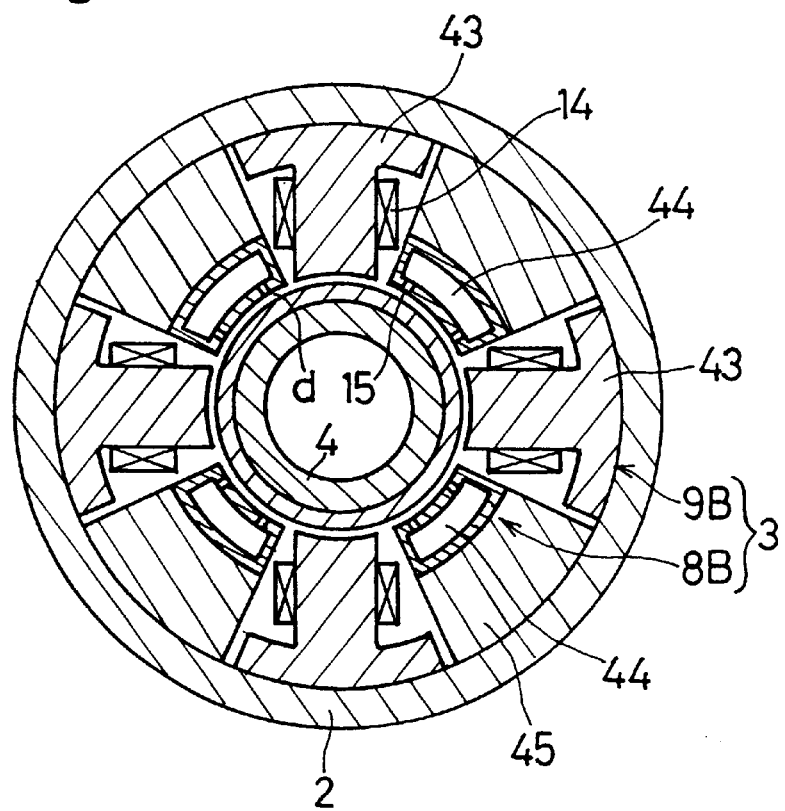
FIG. 16 is a transverse sectional view of the combined externally pressurized gas and magnetic radial bearing assembly according to a seventh preferred embodiment of the present invention.

The structure in which a commonly shared component part is disposed within the width of each of the magnetic bearing and the externally pressurized gas bearing without allowing the component parts of one of them to concurrently serves as the component parts of the other of them can also be realized by positioning the component parts of the magnetic bearing and the component parts of the externally pressurized gas bearing at respective positions displaced in a direction circumferentially of the main shaft. FIG. 16 illustrates a seventh preferred embodiment of the present invention which represents one example of the structure referred to above. As shown therein, the magnetic bearing 8B includes a plurality of stator cores 43 spaced an equal distance from each other in a circumferential direction thereof. The externally pressurized gas bearing 9B includes four externally pressurized gas bearing segments 44 each positioned between the circumferentially neighboring stator cores 43. Each of t hose externally pressurized gas bearing segments 44 is supported by the housing 2 by means of a corresponding spacer 45 that protrudes radially inwardly from the housing 2. The bearing segments 44 have respective inner peripheral walls formed with a plurality of orifices 15 for jetting a compressed air into the bearing gap d. The stator cores 43 and the bearing segments 44 are held in the same axial position and have the same axial width.

Figure 17:
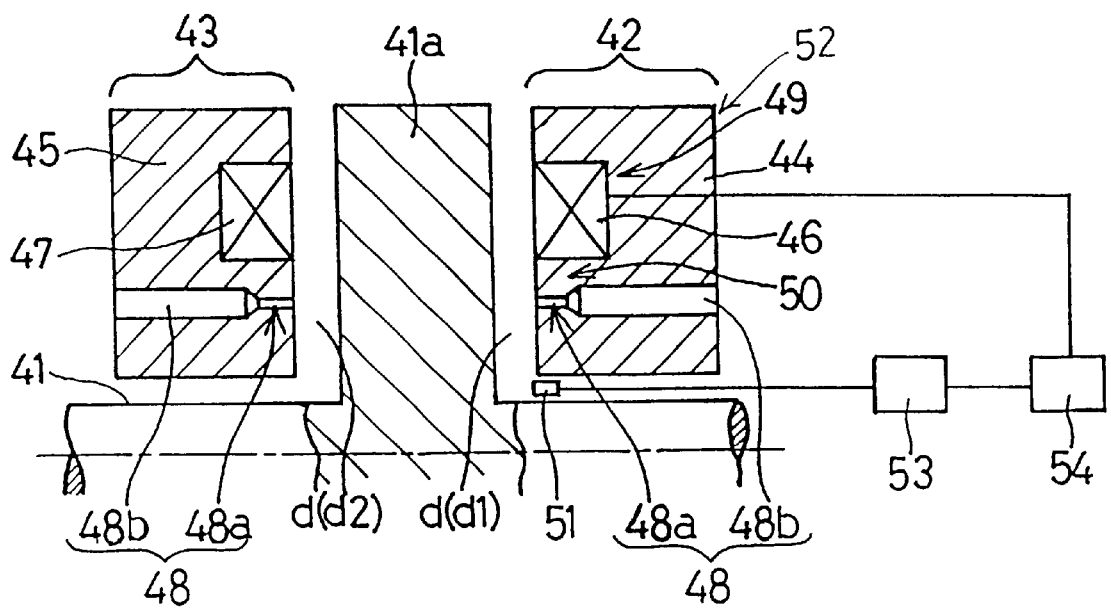
FIG. 17 is a fragmentary longitudinal sectional view of the combined externally pressurized gas and magnetic axial bearing assembly according to an eighth preferred embodiment of the present invention, shown together with a bearing control system.

FIG. 17 illustrates an eighth preferred embodiment of the present invention in which the combined externally pressurized gas and magnetic bearing assembly is applied to an axial bearing, The composite externally pressurized gas and magnetic axial bearing device shown therein comprises first and second combined externally pressurized gas and magnetic axial bearings 42 and 43 disposed axially of the main shaft 41 and on respective sides of a bearing rotor 41a which is a generally collar-shaped axial support of the main shaft 41 made of a magnetizable material. Each of the combined externally pressurized gas and magnetic axial bearings 42 and 43 includes respective coils 46 and 47 accommodatd within respective cores 44 and 45 of associated electromagnets, each of said cores 44 and 45 having a plurality of orifices 48 defined therein in a ring-shaped row external to and coaxial with the main shaft 41. Each of the orifices 48 in each of the cores 44 and 45 is in the form of a self-forming orifice and is comprised of an air conduit 48a, having one end tapered so as to open at the bearing surface of the respective core 44 and 45, and a bering gap d1 and d2. The cores 44 and 45 together with the associated coils 46 and 47 form a bearing stator of a magnetic axial bearing 49 while the cores 44 and 45 together with the associated orifices 48 form an externally pressurized gas axial bearing 50.

When the pressurized fluid medium is jetted in between the cores 44 and 45 and the bearing rotor 41a, a pressure develops between the cores 44 and 45 and the bearing rotor 41a. Because of the use of the self-forming orifices 48, variation of respective gaps d1 and d2 between the core 44 and the bearing rotor 41a and between the core 45 and the bearing rotor 41a results in automatic variation of the pressure and the size of the gaps and, accordingly, an externally pressurized gas bearing having a self-centering capability can be formed. Therefore, the bearing rotor 41a can be floated in a stabilized fashion.

In this case, if the gaps d1 and d2 between the cores 44 and 45 and the bearing rotor 41a are chosen to be of a size equal to or smaller than 0.1 mm, the bearing rigidity of the externally pressurized gas bearing can be increased and even the externally pressurized gas bearing alone can be utilized to float the bearing rotor 41a stably.

This combined externally pressurized gas and magnetic bearing assembly includes a displacement sensor 51 positioned externally thereof for measuring the distance between the cores 44 and 45 and the bearing rotor 41a, and a magnetic bearing control means 53 for controlling an electric current to be supplied to the coils 46 and 47 in dependence on the distance detected by the displacement sensor 51. The magnetic bearing control means 53 controls through, for example, an amplifier 54 the electric current to be supplied to the coils 46 and 47. In this way, it is possible to construct the bearing assembly which concurrently serves as the externally pressurized gas bearing and also the magnetic bearing. The magnetic bearing control means 53 referred to above may employ component parts similar to those employed in the magnetic bearing control means 28 which has been described in connection with the first preferred embodiment.

In the combined externally pressurized gas and magnetic axial bearing assembly according to this embodiment of the present invention, instead of the use of the displacement sensor 51, measurement may be made of the pressure at the externally pressurized gas bearing surface so that the measured pressure can be converted into the size of the bearing gap d in the externally pressurized gas bearing 50, that is, the size of the gap d (d1, d2) between the core 44 or 45 of the electromagnet and the bearing rotor 41a. In dependence on the detected size of the gap d, the electric current to be supplied to the coils 46 and 47 is controlled by the magnetic bearing control means 53.

Where the displacement measurement is carried out in terms of the pressure measurement, an erroneous operation of the sensor which would result from variation in magnetic characteristic of a rotor sensor target surface would not occur, making it possible to accomplish a highly accurate sensing.

Figure 18:
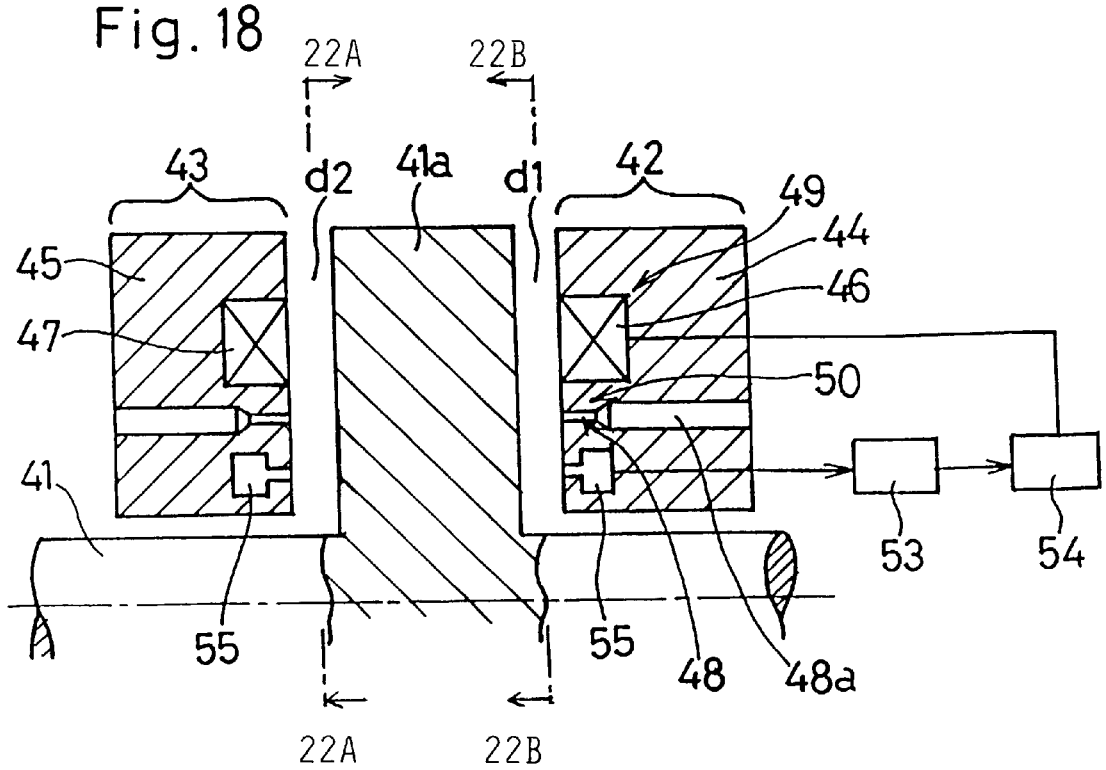
FIG. 18 is a fragmentary longitudinal sectional view of the combined externally pressurized gas and magnetic axial bearing assembly according to the eighth embodiment of the present invention, shown together with a bearing control system, showing a different method of detecting the pressure employed therein.

For this pressure measurement, the embodiment of the present invention shown in FIG. 17 may make use of a pressure sensor 55 within each of the cores 44 and 45 of the electromagnets as shown in FIG. 18 so that the pressure of the externally pressurized gas bearings 50 can be measured directly.

Figure 19:
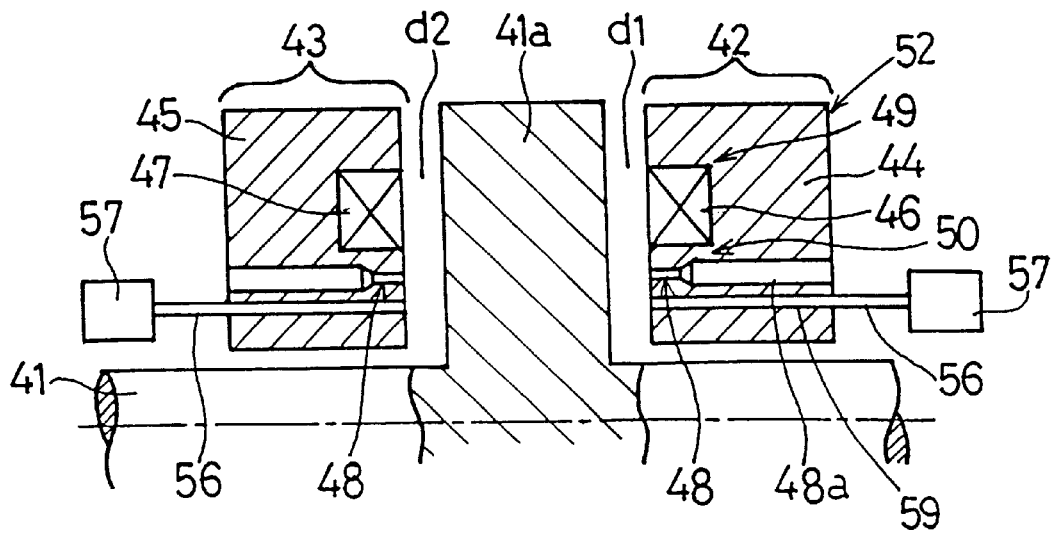
FIG. 19 is a fragmentary longitudinal sectional view of the combined externally pressurized gas and magnetic radial bearing assembly according to the eighth embodiment of the present invention, showing a different method of detecting the pressure employed therein.

Alternatively, as shown in FIG. 19, pressure sensors 57 may be positioned outside the externally pressurized gas bearings 50 so that the pressures within the respective gaps d1 and d2 can be measured directly through associated hollow pipes 56. In such case, micro-passages 59 for pressure sensing have to be formed in respective component parts forming the bearing surfaces of the externally pressurized gas bearings 50 such as, for example, the cores 44 and 45 so as to extend across the corresponding cores 44 and 45 of the electromagnets, which micro-passages 59 are in turn communicated with the corresponding hollow pipes 56. Where the size of each externally pressurized gas bearing 50 is small and a space is available outside the respective bearing, installation of the pressure sensor 57 outside the corresponding bearing is advantageous. Also, each of the micro-passages 59 employed for pressure sensing is preferably of a size having a diameter equal to or smaller than 1 mm so that any possible influence on the respective externally pressurized gas bearing 50 can be eliminated. In addition, each of the hollow pipes 56 communicated with the associated micro-passages 59 is also preferably of a size having an inner diameter equal to or smaller than 1 mm so that the pressure measurement can be accomplished without the frequency characteristic being lowered.

Figure 20:
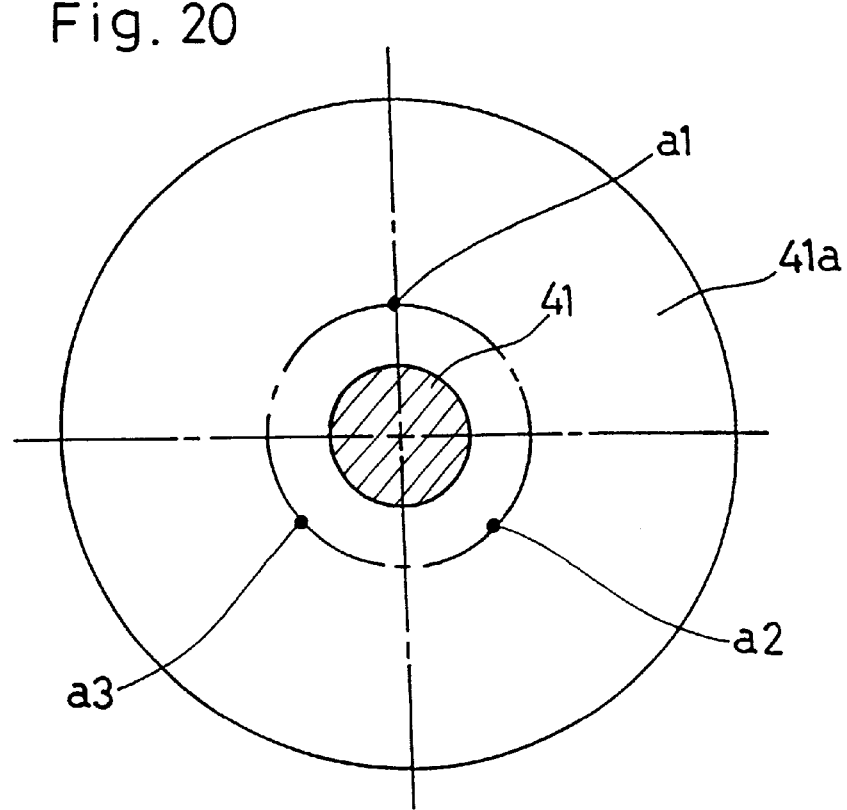
FIG. 20 is an explanatory diagram showing points at which pressure is detected in the combined externally pressurized gas and magnetic radial bearing assembly.

FIG. 20 illustrates a cross-sectional representation of one of the combined externally pressurized gas and magnetic axial bearing assemblies taken along the line A—A in FIG. 18. In this example, three or more pressure sensing points, for example, three pressure sensing points a1, a2 and a3, on each of the opposite externally pressurized gas bearing surfaces of the combined externally pressurized gas and magnetic axial bearing assemblies, which are spaced an equal distance in a direction circumferentially of the bearing rotor 41a and also in a direction radially outwardly from the longitudinal axis of the main shaft 41 are chosen for the points at which the pressure is measured. The respective pressures detected at those pressure sensing points a1, a2 and a3 are so utilized as to be converted into the respective sizes of the gaps d1 and d2 between the bearing rotor 41a and the cores 44 and 45 of the electromagnets at those points and are then averaged. By so doing, the position of the bearing rotor 41a with respect to the axial direction can be accurately measured. It is to be noted that the averaging of the sizes of the gaps d1 and d2 at those pressure sensing points is carried out by, for example, the magnetic bearing control means 53.

Figure 21:
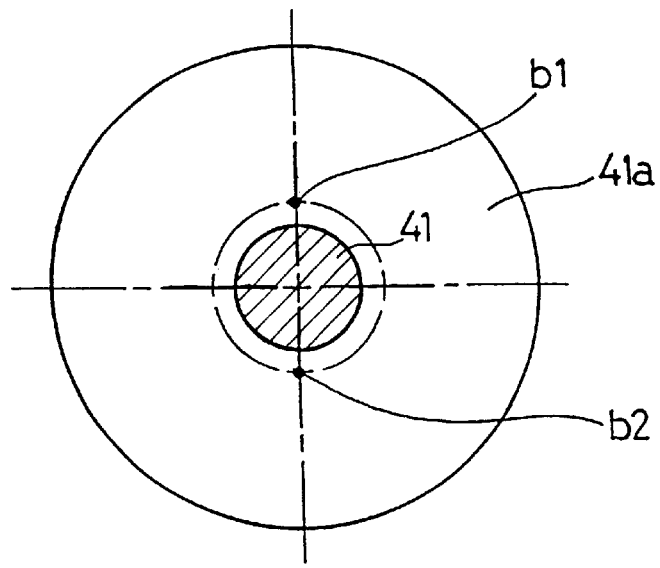
FIG. 21 is an explanatory diagram showing the different points at which pressure is detected in the combined externally pressurized gas and magnetic radial bearing assembly.
Figure 22A:
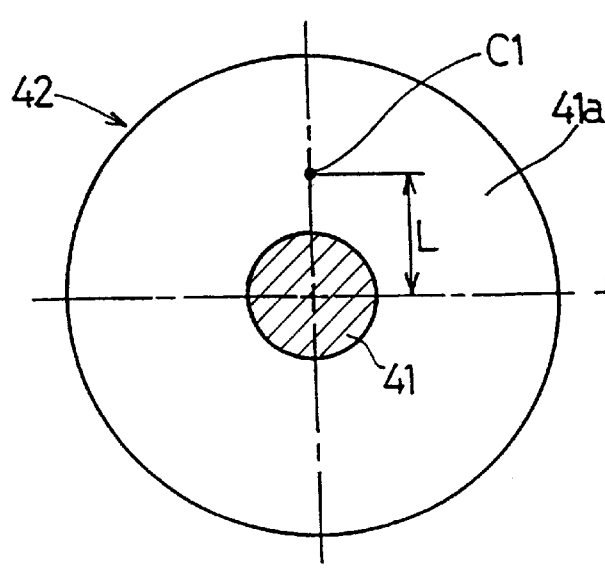
FIGS. 22A and 22B are cross sectional views, taken along the line A—A and the line B—B in FIG. 18, showing further different points at which pressure is detected in the combined externally pressurized gas and magnetic radial bearing assembly.
Figure 22B:
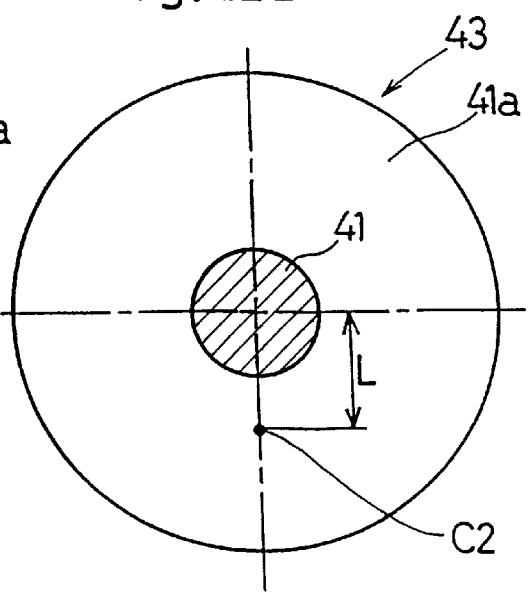

It is to be noted that in stead of the pressure measurement being carried out at those three pressure sensing points, two pressure sensing points b1 and b2 spaced 180° from each other in the circumferential direction of the bearing rotor 41a may be employed as shown in FIG. 21 which similarly illustrates a cross-sectional representation taken along the line A—A in FIG. 18. The use of the pressure sensing points b1 and b2 spaced 180° circumferentially is effective to measure the position of the bearing rotor 41a in the axial direction with a minimized number of pressure sensors, without being adversely affected by pitching and/or yawing motions of the bearing rotor 41a.

Where the combined externally pressurized gas and magnetic axial bearing assemblies 42 and 43 are disposed on the respective sides of the bearing rotor 41a such as shown in FIG. 18, the use of one pressure sensing point may be sufficient for each of the bearing gaps d1 and d2 as shown in FIGS. 22A and 22B which illustrate respective cross-sectional representation taken along the line A—A and the line B—B in FIG. 18. Specifically, FIG. 22A illustrates one of the opposite bearing surfaces of the bearing rotor 41a confronting the combined externally pressurized gas and magnetic axial bearing assembly 42 while FIG. 22B illustrates the other of the opposite bearing surfaces of the bearing rotor 41a confronting the combined externally pressurized gas and magnetic axial bearing assembly 43. The pressure sensing point c1 associated with the bearing gap d1 and the pressure sensing point c2 associated with the bearing gap d2 are spaced 180° from each other in a direction circumferentially of the bearing rotor 41a, but are spaced an equal distance L radially outwardly from the longitudinal axis of the main shaft 41. In this case, the magnetic bearing control means 53 is operable to calculate the difference between the respective sizes of the bearing gaps d1 and d2, which are determined from the pressures measured respectively at the pressure sensing points c1 and c2, to thereby control the electric current to be supplied to the coils 46 and 47. Accordingly, without being adversely affected by the pitching and/or yawing motions of the bearing rotor 41a, and even though the bearing rotor 41a undergoes a thermal expansion, the position of the bearing rotor 41a in the axial direction can be measured with a minimized number of pressure sensors.

Even with the arrangement shown in any one of FIG. 20, FIG. 21 and FIGS. 22A and 22B, the displacement of the bearing rotor 41a in the axial direction can be accurately measured at a reduced cost by the previously described control method.

It is to be noted that the pressure sensors employed in the practice of any one of the foregoing embodiments of the present invention, for example, each pressure sensor shown in any one of FIGS. 8, 17 and 18 may be employed in the form of a semiconductor pressure sensor. Where the semiconductor pressure sensors are employed, not only can the apparatus be made compact in structure, but results of measurement can be drawn to the outside in the form of electric signals.

Figure 23:
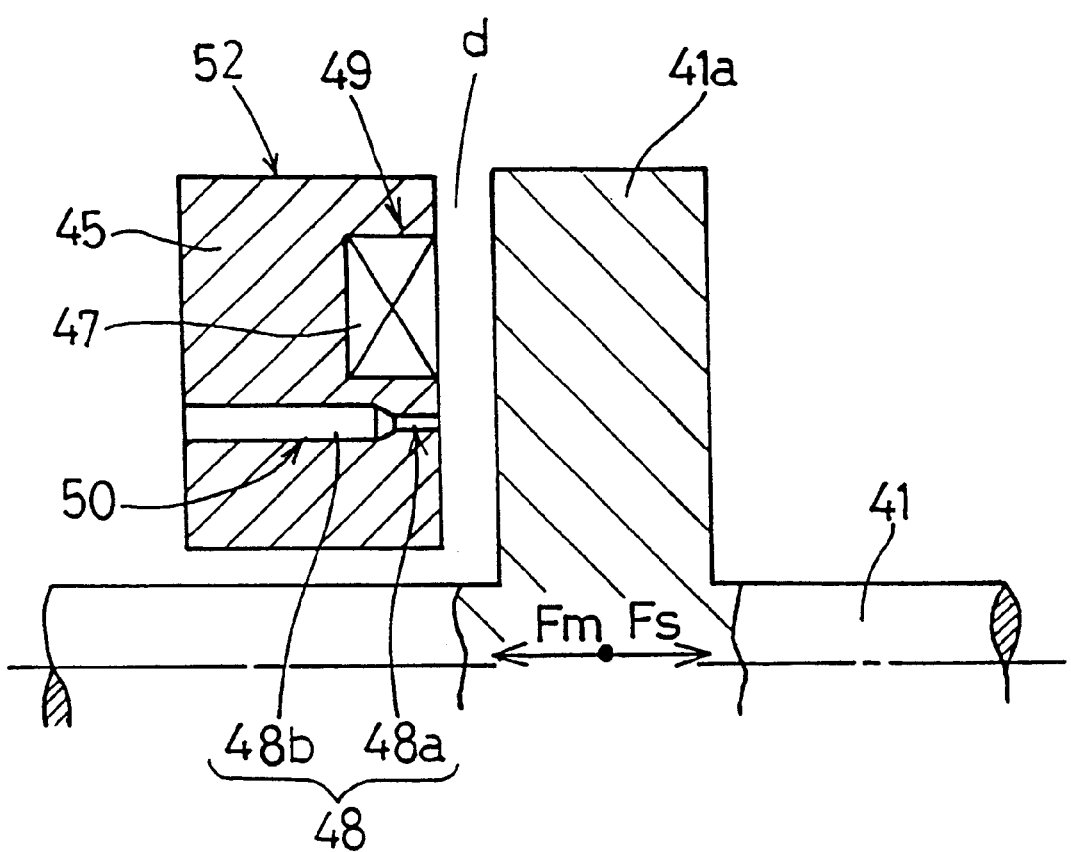
FIG. 23 is a fragmentary longitudinal sectional view of the combined externally pressurized gas and magnetic radial bearing assembly according to a ninth preferred embodiment of the present invention.

The combined externally pressurized gas and magnetic axial bearing assembly according to a ninth preferred embodiment of the present invention is shown in FIG. 23.

According to the embodiment shown in FIG. 23, the combined externally pressurized gas and magnetic axial bearing assembly is of a type designed to support only one side of the bearing rotor 41a of the main shaft 41. In other words, the stator core 45 of the magnetic bearing 49 and the orifices 48 of the externally pressuized gas bearing 50 are positioned only on one side of the bearing rotor 41a with respect to the axial direction of the main shaft 41.

In this embodiment of FIG. 23, a force Fm imposed by the magnetic bearing 49 on the bearing rotor 41a acts as a suction force while a force Fs imposed by the externally pressurized gas bearing 50 on the bearing rotor 41a acts as a repulsive force. Accordingly, the externally pressurized gas bearing 50 alone is unable to support the bearing rotor if the rotor axial direction lies vertically. However, since the magnetic bearing 49 is utilized in combination with the externally pressurized gas bearing 50, the bearing rotor 41a can be supported satisfactorily regardless of the direction in which the bearing is installed. Thus, by designing the combined externally pressurized gas and magnetic bearing assembly in which the magnetic bearing 49 and the externally pressurized gas bearing 50 are disposed only on one side of the bearing rotor 41a of the main shaft 41 to allow the suction force and the repulsive force to be counterbalanced with each other, the bearing assembly can be made further compact.

Figure 24:
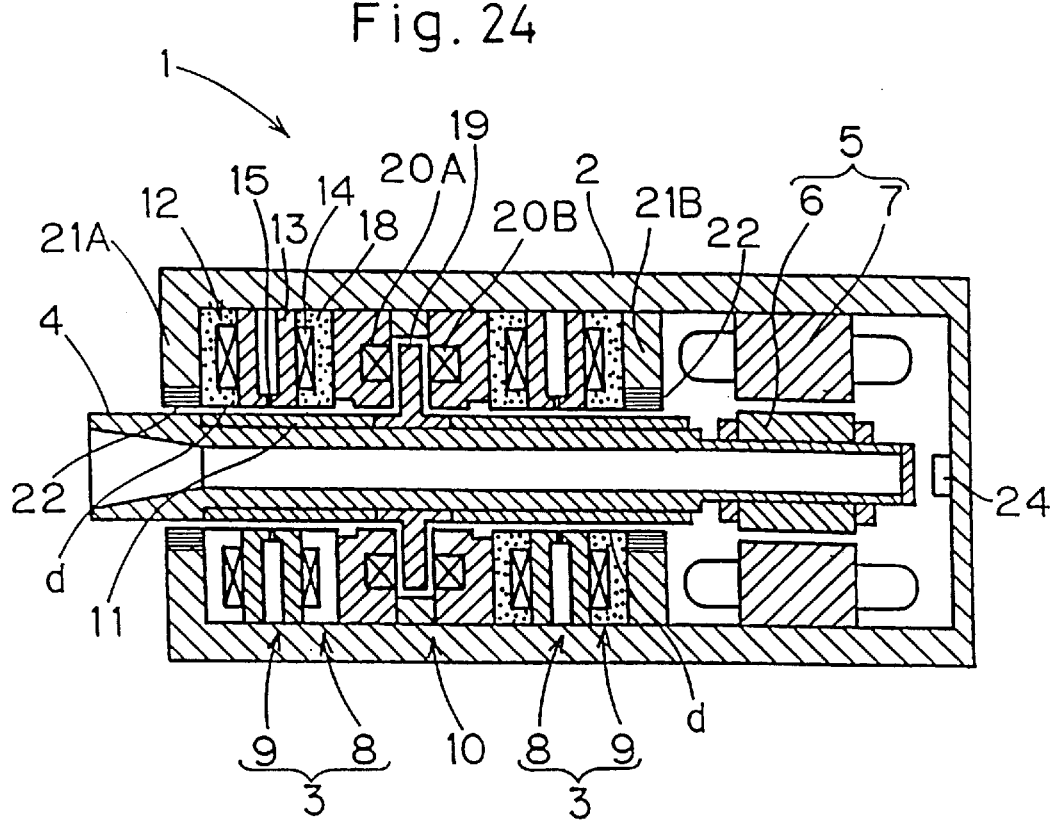
FIG. 24 is a schematic longitudinal sectional view of the spindle device utilizing the combined externally pressurized gas and magnetic bearing assembly according to a tenth preferred embodiment of the present invention.

FIG. 24 illustrates, in a schematic longitudinal sectional representation, the spindle device utilizing the combined externally pressurized gas and magnetic bearing assemblies according to a second preferred embodiment of the present invention. This spindle device 1 is different from the spindle device 1 of FIG. 1 in that the drive motor 5, the combined externally pressurized gas and magnetic bearing assemblies 3 and the axial magnetic bearing 10 are disposed at respective locations different from those in the spindle device 1 of FIG. 1, with the drive motor 5 positioned rearmost of the housing 2. The axial magnetic bearing 10 is disposed between the front and rear combined externally pressurized gas and magnetic bearing assemblies 3. The remaining arrangement is substantially similar to that in the foregoing embodiment of the present invention.

In the motor device used in the practice of the first embodiment of the present invention shown in FIG. 1 where the drive motor 5 is designed to be of a type capable of providing a high output, the rotor 6 of the drive motor 5 would require both an increased wall thickness and an increased mass which would eventually result in reduction of the natural frequency of bending. However, in the embodiment of the present invention shown in FIG. 24, the problem associated with the possible reduction in natural frequency is eliminated by disposing the drive motor 5 at a location around a rear end portion of the main shaft 4.

Figure 25:
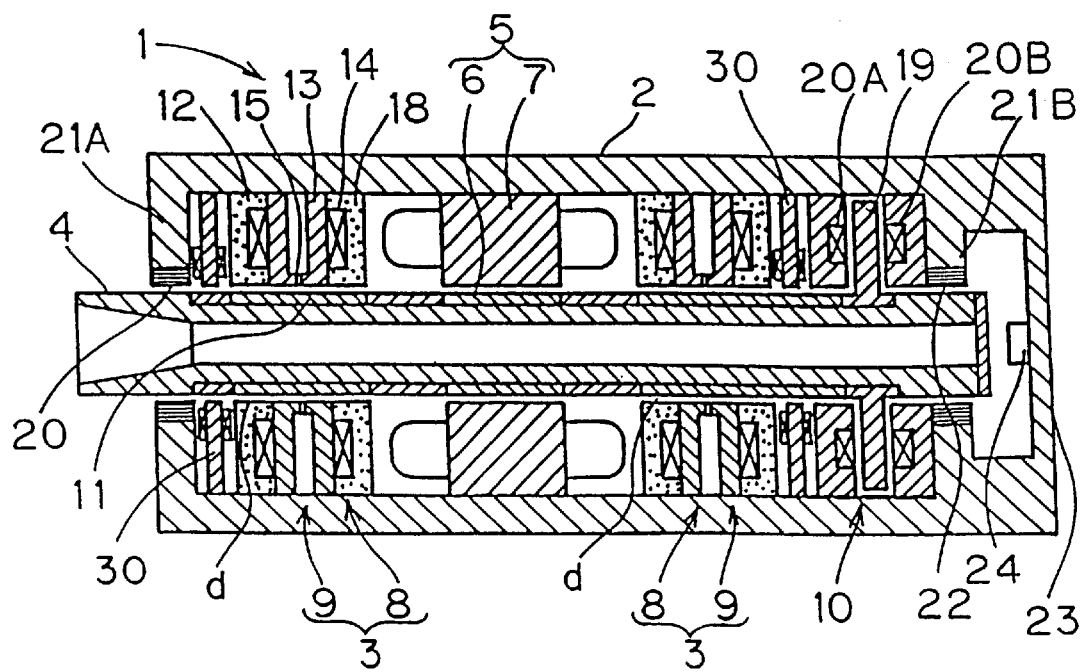
FIG. 25 is a schematic longitudinal sectional view of the spindle device utilizing the combined externally pressurized gas and magnetic bearing assembly according to an eleventh preferred embodiment of the present invention.

An eleventh preferred embodiment of the present invention is shown in FIG. 25. The spindle device 1 embodying the combined externally pressurized gas and magnetic bearing assemblies is different from the spindle device 1 of FIG. 1 in that an eddy-current displacement sensor 30 is employed for each of the displacement sensors for detecting the radial displacement of the main shaft 4 relative to the bearing. While the sensors 30 may be positioned at a location either forwardly or rearwardly of the respective combined externally pressurized gas and magnetic bearing assemblies 3, in the illustrated embodiment the sensor 30 associated with the front combined externally pressurized gas and magnetic bearing assembly 3 is positioned forwardly of such front bearing assembly 3 whereas the sensor 30 associated with the rear combined externally pressurized gas and magnetic being assembly 3 is positioned rearwardly of such rear bearing assembly 3. It is to be noted that in place of the eddy-current displacement sensor 30, reluctance displacement sensors or static capacity displacement sensors may be employed. The arrangement other than that described above remains the same as in the embodiment of the present invention shown in FIGS. 1 and 2.

Figure 26:
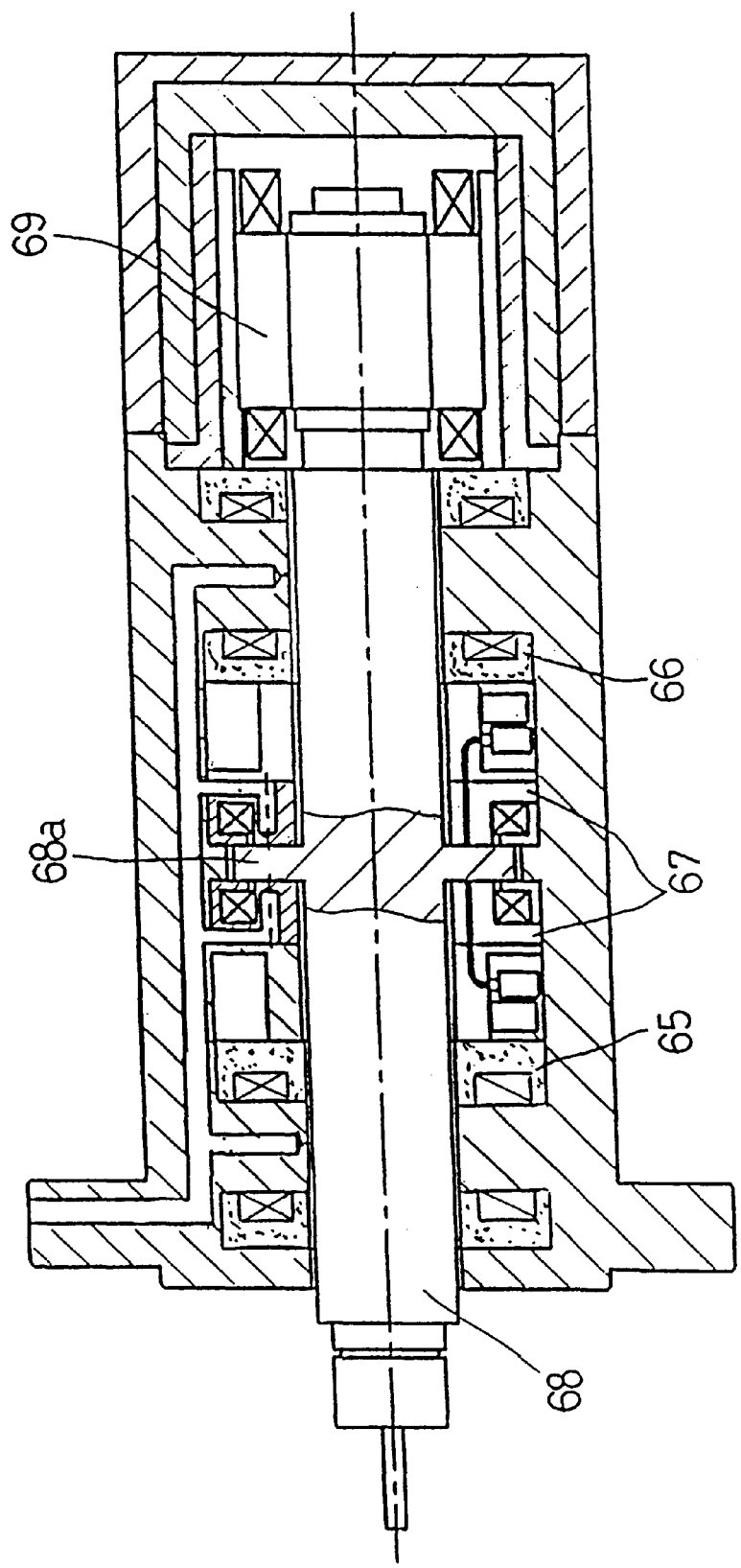
FIG. 26 is a schematic longitudinal sectional view of only a portion of the spindle device utilizing the combined externally pressurized gas and magnetic bearing assembly according to a twelfth preferred embodiment of the present invention.

FIG. 26 illustrates the spindle device according to a twelfth preferred embodiment of the present invention in which the combined externally pressurized gas and magnetic bearing assemblies are employed. Specifically, this spindle device shown in FIG. 26 comprises two combined externally pressurized gas and magnetic radial bearings assembly 65 and 66, a single combined externally pressurized gas and magnetic axial bearing assembly 67, and a drive motor 69 for driving the main shaft 68. The main shaft 68 has a generally collar-shaped bearing rotor 68a formed integrally therewith so as to protrude radially outwardly therefrom. The combined externally pressurized gas and magnetic radial bearing assemblies 65 and 66 and the combined externally pressurized gas and magnetic axial bearing assembly 67 may be those which have hereinbefore described in details and, therefore, the details thereof will not be reiterated for the sake of brevity.

Figure 27:
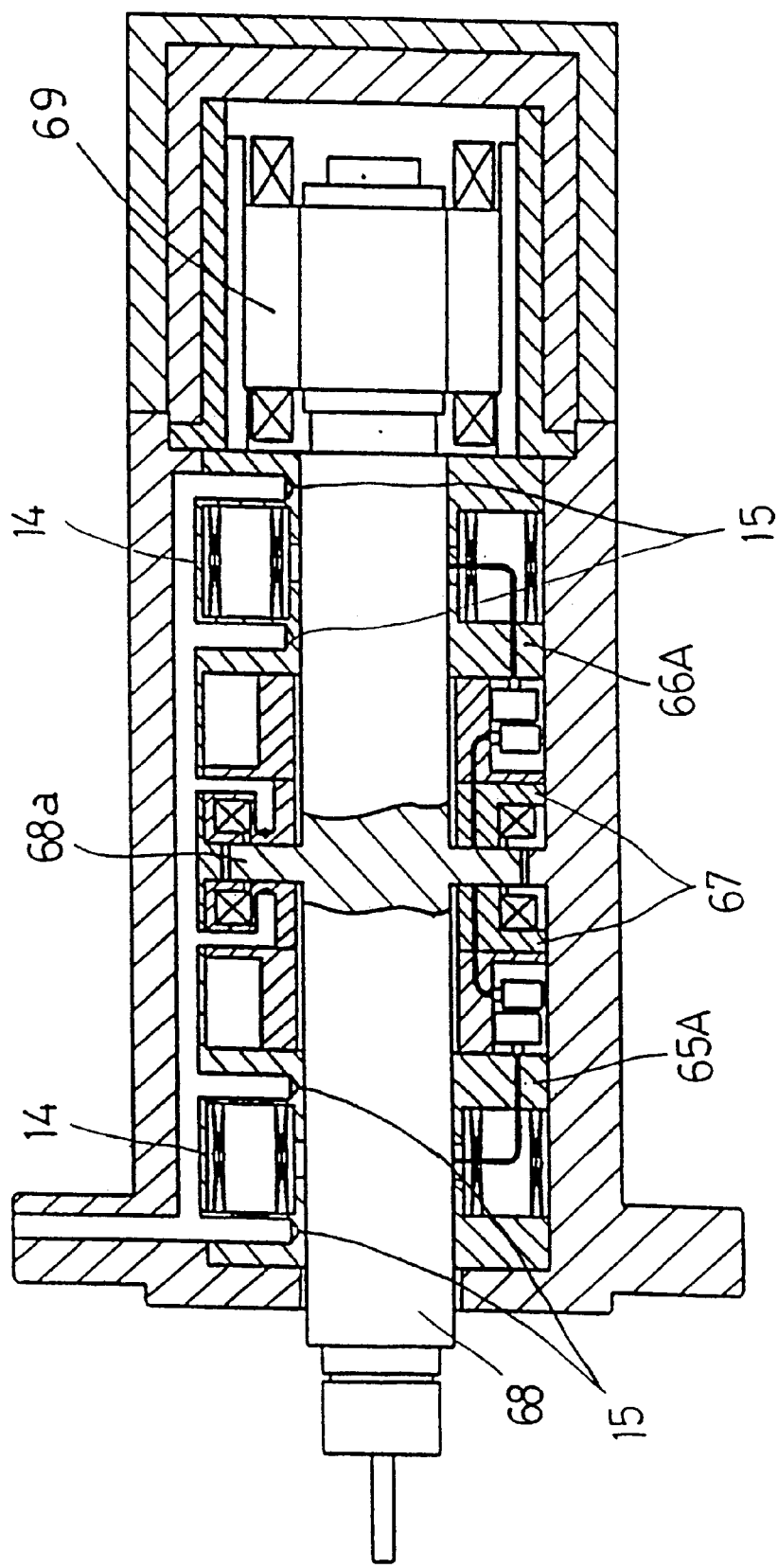
FIG. 27 is a schematic longitudinal sectional view of only a portion of the spindle device utilizing the combined externally pressurized gas and magnetic bearing assembly according to a thirteenth preferred embodiment of the present invention.
Figure 28:
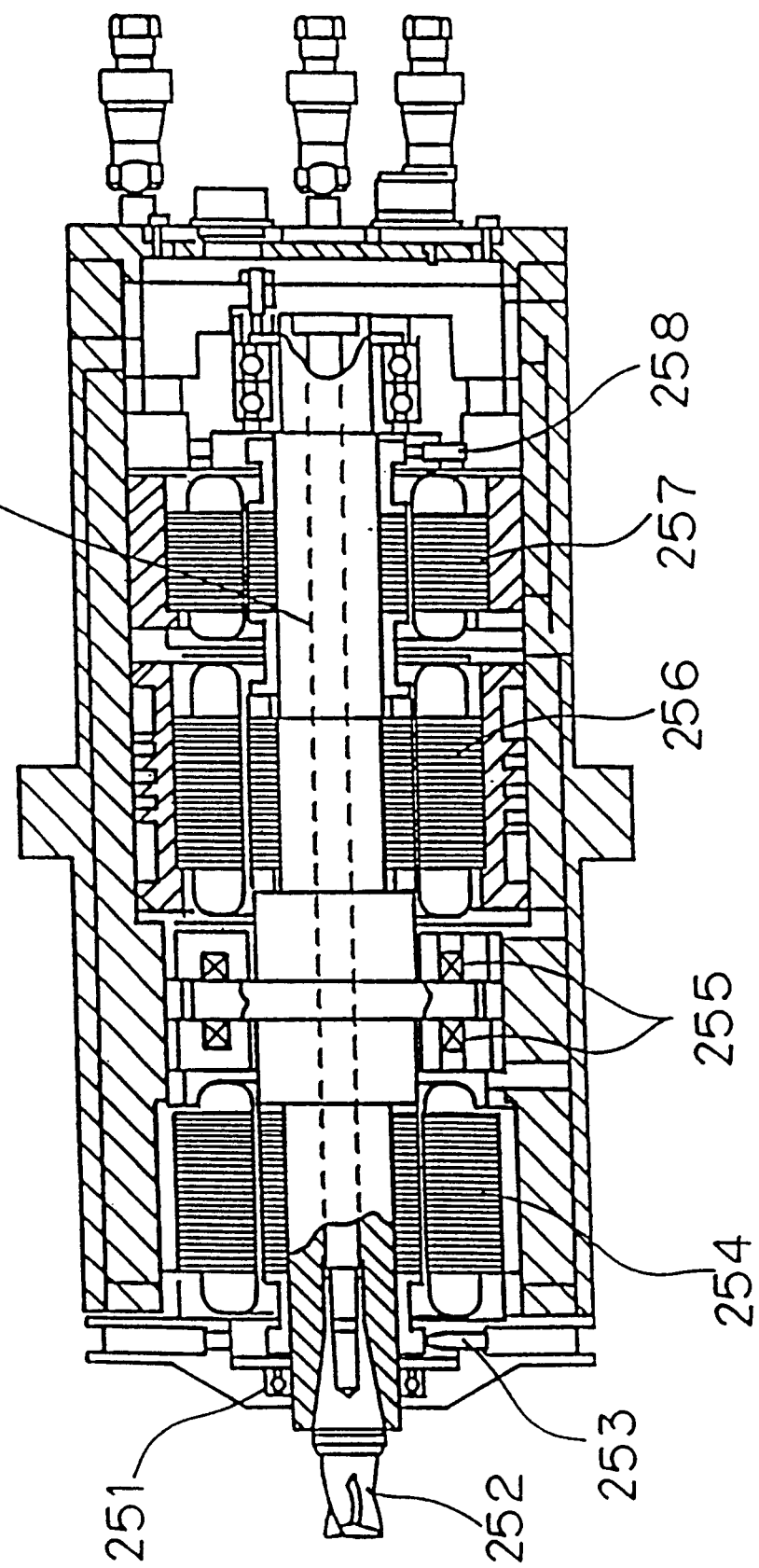
FIG. 28 is a schematic longitudinal sectional view of the prior art spindle device utilizing a magnetic bearing.
Figure 29:
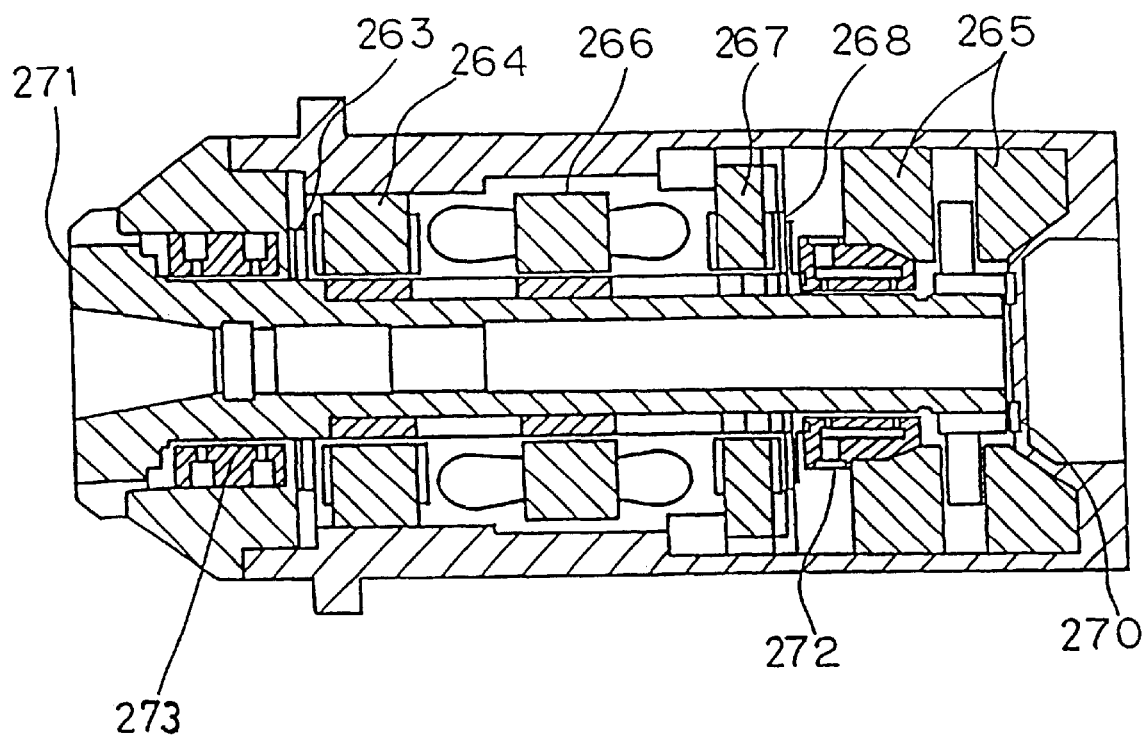
FIG. 29 is a schematic longitudinal sectional view of the prior art spindle device utilizing a combined externally pressurized gas and magnetic bearing assembly.

In the spindle device of the structure shown in FIG. 26, the combined externally pressurized gas and magnetic radial bearing assemblies 65 and 66 may be superseded by combined externally pressurized gas and magnetic radial bearing assemblies 65A and 66A each having a self-forming orifice 15 on respective sides of the coils 14 with respect to a direction parallel to the main shaft 68, as shown in FIG. 27, according to a thirteenth preferred embodiment of the present invention.

It is, however, to be noted that all of the bearing assemblies may not be a combined externally pressurized gas and magnetic bearing assembly. By way of example, where the static rigidity is desired to be increased in the axial direction, the axial bearing may be constituted by the combined externally pressurized gas and magnetic bearing assembly, in which case the bearing support in the radial direction may be accomplished by the use of an externally pressurized gas bearing. On the other hand, where the static rigidity is desired to be increased in the radial direction, the combined externally pressurized gas and magnetic radial bearing assembly may be disposed on a load bearing end of the spindle, in which case the bearing support in the axial direction may be accomplished by the use of an externally pressurized gas bearing.

In the practice of the foregoing embodiment of the present invention shown in FIG. 26, the control gain of the magnetic bearing is preferably lowered during a low-speed rotation, but changed to a predetermined value when the number of revolutions of the main shaft attains a value equal to or greater than a predetermined value. Setting and change of this control gain are carried out by the magnetic bearing control means 28 and 53.

The method by which the spindle device is started will now be described. It is to be noted that any of this driving method and other driving methods as will be described later can be applied to the spindle device of any of the foregoing embodiments of the present invention.

According to this driving method, the fluid medium under pressure is first supplied to the orifices of each of the combined externally pressurized gas and magnetic bearing assemblies to cause the main shaft or the bearing rotor integral therewith to be floated by mean of solely the externally pressurized gas bearings. While the main shaft or the bearing rotor is floated, the value of the displacement sensor (or the displacement measured by the pressure sensor) is shifted to zero, followed by actuation of the control of the magnetic bearing. By driving in this way, the main shaft or the rotor can be floated while the externally pressurized gas bearing and the weight of the main shaft or the rotor are balanced with each other at all times, and, therefore, there is no possibility that the electric current is unnecessarily supplied through the electromagnet coils of the magnetic bearings, thereby suppressing any possible adverse influence which would be brought about by the negative rigidity of the magnetic bearing.

Another driving method will now be described. In the first place, the fluid medium under pressure is supplied to the orifices of each of the combined externally pressurized gas and magnetic bearing assemblies to cause the main shaft or the bearing rotor integral therewith to be floated by mean of solely the externally pressurized gas bearings. While the main shaft or the bearing rotor is floated, the main shaft is driven at a predetermined rpm value, and a DC (direct current) component of the output from the displacement sensor (or the displacement measured by the pressure sensor) is shifted to zero, followed by start of the control of the magnetic bearings. With the spindle device so started, in consideration of not only the balance between the externally pressurized gas bearings and the weight of the main shaft or the bearing rotor, but also the static force that is developed by a delicate imbalance of the force of action delivered from the fluid medium flowing around the main shaft and the bearing rotor incident to rotation of the main shaft or the bearing rotor, the magnetic bearings can be actuated with that condition occurring at the center of the bearing rotor. Also, any possible influence can be avoided which would otherwise be brought about by the core loss developed within the main shaft and the bearing rotor by the effect of magnetic fluxes of the magnetic bearings during increase of rotation of the main shaft and the bearing rotor, permitting the main shaft to be driven at a high speed.

The spindle device can also be started by a still another method which will now be described. In the first place, the fluid medium under pressure is supplied to the orifices of each of the combined externally pressurized gas and magnetic bearing assemblies to permit the bearing rotor to be floated solely by the externally pressurized gas bearings. While the main shaft or the bearing rotor is floated, the value of the displacement sensor (or the displacement measured by the pressure sensor) is shifted to zero. The magnetic bearings are actuated while the gain of the magnetic bearing control circuit is lowered. Thereafter, when the main shaft or the bearing rotor is rotated at a speed equal to or greater than a predetermined rpm value, the control gain referred to above is changed to a predetermined value. With the spindle device so started, any possible influence can be avoided which would otherwise be brought about by the core loss developed within the main shaft and the bearing rotor by the effect of magnetic fluxes of the magnetic bearings during increase of rotation of the main shaft and the bearing rotor, permitting the main shaft to be driven at a high speed. Also, since the magnetic bearings are actuated while the gain is lowered, any possible external disturbance to the main shaft and the bearing rotor which would be brought about at the moment the magnetic bearings are actuated can be suppressed advantageously.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, instead of the self-forming orifice referred to hereinbefore, any other fluid restriction such as a normal orifice which does not make use of the bearing gap can be employed. Accordingly, such changes and modifications are, unless they depart from the scope of the present invention as delivered from the claims annexed hereto, to be construed as included therein.

What is claimed is:

1. A combined externally pressurized gas and magnetic bearing assembly which comprises:
   a magnetic bearing including a displacement measuring means for measuring a displacement of a rotor, said magnetic bearing being operable to support the rotor at a predetermined position by generating an electromagnetic force according to the displacement measured by the displacement measuring means;
   an externally pressurized gas bearing having a fluid restrictor defined in a bearing stator of the magnetic bearing; and
   a magnetic bearing control means for controlling the magnetic bearing using a feed-back scheme according to the displacement of the rotor measured by the displacement measuring means, said magnetic bearing control means being operable to perform the control using an integral action or a proportional integral action and to affect no control to a high frequency higher than a predetermined value.

2. The combined externally pressurized gas and magnetic bearing assembly as claimed in claim 1, further comprising an amplifier unit for processing an output from the displacement measuring means, said amplifier unit including a linearizing circuit for linearizing a characteristic relationship between a control voltage and an electromagnetic force without supplying a bias current to coils of an electromagnet of the magnetic bearing.

3. The combined externally pressurized gas and magnetic bearing assembly as claimed in claim 1, further comprising a processing means for processing the value measured by the displacement measuring means, said processing means having an insensitive zone, and wherein said magnetic bearing control means offers no control to the magnetic bearing in the event that the displacement measured by said displacement measuring means is within a predetermined range.

4. The combined externally pressurized gas and magnetic bearing assembly as defined by claim 1, wherein said magnetic control means includes two distinct control systems, a first control system for performing feedback control of said magnetic bearing in a Y-axis direction, and a second control system for performing feedback control of said magnetic bearing in an X-axis direction, wherein said first and second control systems receive data from independent sources.

5. A spindle device comprising:
   a magnetic bearing including a displacement measuring means for measuring a displacement of a rotor, said magnetic bearing being operable to support the rotor at a predetermined position by generating an electromagnetic force according to the displacement measured by the displacement measuring means;
   an externally pressurized gas bearing having a fluid restrictor defined in a bearing stator of the magnetic bearing; and a magnetic bearing control means for controlling the magnetic bearing using a feed-back scheme according to the displacement of the rotor measured by the displacement measuring means, said magnetic bearing control means being operable to perform the control using an integral action or a proportional integral action and to affect no control to a high frequency higher than a predetermined value, wherein said spindle device rotatably supports a main shaft having the rotor formed thereon, and a control system which causes said main shaft to be floated on a non-contact basis when the externally pressurized gas bearing is activated during a start of the externally pressurized gas bearing, and a direct current component of an output from the displacement measuring means to be zeroed, followed by activation of the magnetic bearing.

6. A spindle device comprising a magnetic bearing including a displacement measuring means for measuring a displacement of a rotor, said magnetic bearing being operable to support the rotor at a predetermined position by generating an electromagnetic force according to the displacement measured by the displacement measuring means;

an externally pressurized gas bearing having a fluid restrictor defined in a bearing stator of the magnetic bearing; and a magnetic bearing control means for controlling the magnetic bearing using a feed-back scheme according to the displacement of the rotor measured by the displacement measuring means, said magnetic bearing control means being operable to perform the control using an integral action or a proportional integral action and to affect no control to a high frequency higher than a predetermined value, wherein said spindle device rotatably supports a main shaft having the rotor formed thereon, and a control system which cause said main shaft to be driven after the main shaft has been floated on a non contact basis when the externally pressurized gas bearing is activated during a start of the externally pressurized gas bearing, and a direct current component it of an output from the displacement measuring means to be zeroed when the main shaft attains a predetermined number of revolutions or higher than the predetermined number of revolutions, followed by activation of the magnetic bearing.

7. A spindle device comprising a magnetic bearing including a displacement measuring means for measuring a displacement of a rotor, said magnetic bearing being operable to support the rotor at a predetermined position by generating an electromagnetic force according to the displacement measured by the displacement measuring means;

an externally pressurized gas bearing having a fluid restrictor defined in a bearing stator of the magnetic bearing; and a magnetic bearing control means for controlling the magnetic bearing using a feed-back scheme according to the displacement of the rotor measured by the displacement measuring means, said magnetic bearing control means being operable to perform the control using an integral action or a proportional integral action and to affect no control to a high frequency higher than a predetermined value, wherein said spindle device rotatably supports a main shaft having the rotor formed thereon, wherein the magnetic bearing control means has a band eliminating filter which filters an output signal of the displacement measuring means when the number of revolutions of the main shaft is detected as attaining a value higher than a predetermined value.

8. A spindle device comprising a magnetic bearing including a displacement measuring means for measuring a displacement of a rotor, said magnetic bearing being operable to support the rotor at a predetermined position by generating an electromagnetic force according to the displacement measured by the displacement measuring means;

an externally pressurized gas bearing having a fluid restrictor defined in a bearing stator of the magnetic bearing; and a magnetic bearing control means for controlling the magnetic bearing using a feed-back scheme according to the displacement of the rotor measured by the displacement measuring means, said magnetic bearing control means being operable to perform the control using an integral action or a proportional integral action and to affect no control to a high frequency higher than a predetermined value, wherein said spindle device rotatably supports a main shaft having the rotor formed thereon, wherein the magnetic bearing control means lowers a control gain of the magnetic bearing during a low speed rotation, but varies the control gain to a predetermined value when the number of revolutions of the main shaft attains a value higher than a predetermined value.

* * * * *